US008811511B2

(12) United States Patent
Sayeed et al.

(10) Patent No.: US 8,811,511 B2
(45) Date of Patent: Aug. 19, 2014

(54) HYBRID ANALOG-DIGITAL PHASED MIMO TRANSCEIVER SYSTEM

(75) Inventors: Akbar M. Sayeed, Madison, WI (US); Nader Behdad, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 995 days.

(21) Appl. No.: 12/891,887

(22) Filed: Sep. 28, 2010

(65) Prior Publication Data

US 2012/0076498 A1 Mar. 29, 2012

(51) Int. Cl.
*H04B 7/02* (2006.01)

(52) U.S. Cl.
USPC ........... 375/267; 375/260; 375/295; 375/299; 343/755; 343/912; 343/907; 343/914

(58) Field of Classification Search
USPC .......... 375/267, 260, 295, 299; 343/755, 912, 343/907, 914
See application file for complete search history.

(56) References Cited

U.S. PATENT DOCUMENTS

| | | | | |
|---|---|---|---|---|
| 4,381,509 | A | 4/1983 | Rotman et al. | |
| 7,898,480 | B2 * | 3/2011 | Ebling et al. | 343/700 MS |
| 2006/0028386 | A1 * | 2/2006 | Ebling et al. | 343/754 |
| 2008/0055175 | A1 | 3/2008 | Rebeiz et al. | |
| 2010/0103049 | A1 | 4/2010 | Tabakovic | |
| 2010/0194663 | A1 | 8/2010 | Rothwell et al. | |
| 2010/0207833 | A1 | 8/2010 | Toso et al. | |
| 2012/0033618 | A1 * | 2/2012 | Wallace et al. | 370/328 |
| 2013/0322495 | A1 | 12/2013 | Behdad et al. | |

FOREIGN PATENT DOCUMENTS

| | | | |
|---|---|---|---|
| EP | 2182582 | A1 | 5/2010 |
| EP | 2221919 | A1 | 8/2010 |
| WO | WO 2007/127955 | A2 | 11/2007 |
| WO | WO 2008/061107 | A2 | 5/2008 |

OTHER PUBLICATIONS

Rao et al., Measurement Results of an Affordable Hybrid Phased Array Using a Radant Lens, Naval Research Laboratory Memo Report No. 5320--00-8439, May 15, 2000, Washington, D.C.
Römisch et al., Multi-Beam Discrete Lens Arrays with Amplitude-Controlled Steering, 2003 IEEE MTT-S International Microwave Symposium Digest, Philadelphia, PA, Jun. 2003, pp. 1669-1672.
Römisch et al., Multibeam Planar Discrete Millimeter-Wave Lens for Fixed-Formation Satellites, 2002 URSI General Assembly Digest, Maastricht, The Netherlands, Aug. 2002.

(Continued)

*Primary Examiner* — Siu Lee
(74) *Attorney, Agent, or Firm* — Bell & Manning, LLC

(57) ABSTRACT

A transmitter supporting multiple-input, multiple-output communications is provided. The transmitter includes a signal processor, a plurality of feed elements, and an aperture. The signal processor is configured to simultaneously receive a plurality of digital data streams and to transform the received plurality of digital data streams into a plurality of analog signals. The number of the plurality of digital data streams is selected for transmission to a single receive antenna based on a determined transmission environment. The plurality of feed elements are configured to receive the plurality of analog signals, and in response, to radiate a plurality of radio waves toward the aperture. The aperture is configured to receive the radiated plurality of radio waves, and in response, to radiate a second plurality of radio waves toward the single receive antenna.

20 Claims, 15 Drawing Sheets

(56) References Cited

OTHER PUBLICATIONS

Abbaspour-Tamijani et al., A planar filter-lens array for millimeter-wave applications, Proceedings of the IEEE International Antennas and Propagation Society International Symposium, vol. 1, Monterey, CA, Jun. 20-25 2004, pp. 675-678.
International Search Report and Written Opinion received in PCT/US2011/045911, Jan. 19, 2012.
Lee et al., Multi-Beam Phased Array Antennas, Jan. 1, 2002, http://www.archive.org/details/nasa_techdoc_20030020930.
Hong et al., Spatial Processing With Lens Antenna Arrays for Direction-of-Arrival Estimation, Proceedings from "International Union of Radio Science" 27th General Assembly, Aug. 17-24, 2002, Maastricht, the Netherlands, http://www.ursi.org/Proceedings/ProcGA02/ursiga02.pdf.
Schoenberg et al., Two-level power combining using a lens amplifier, IEEE Trans. Microwave Theory Techn., Dec. 1994, vol. 42, No. 12, pp. 2480-2485.
Shiroma et al., A quasi-optical receiver with angle diversity, Proceedings of the IEEE International Microwave Symposium, San Francisco, 1996, pp. 1131-1134.
McGrath et al., Planar three-dimensional constrained lenses, IEEE Trans. Antennas Propagat., Jan. 1986, vol. 34, No. 1, pp. 46-50.
Hollung et al., A bi-directional quasi-optical lens amplifier, IEEE Trans. Microwave Theory Techn., Dec. 1997, vol. 45, No. 12, pp. 2352-2357.
Popovic et al., Quasi-optical transmit/receive front ends, IEEE Trans. Microwave Theory Techn., Nov. 1998, vol. 48, No. 11, pp. 1964-1975.
Pozar et al., Flat lens antenna concept using aperture coupled microstrip patches, Electronics Letters, Nov. 7, 1996, vol. 32, No. 23, pp. 2109-2111.
Saleau et al., Quasi axis-symmetric integrated lens antennas: design rules and experimental/manufacturing trade-offs at millimeter-wave frequencies, Microwave and Optical Technology Letters, Jan. 2006, vol. 48, No. 1, pp. 20-29.
Al-Joumayly et al., Slide presentation of "Design of conformal, high-resolution microwave lenses using sub wavelength periodic structures", 2010 IEEE Antennas and Propagation Society/URSI Symposium, Toronto, ON , Jul. 11-17, 2010.
Al-Joumayly et al., Abstract of "Design of conformal, high-resolution microwave lenses using sub wavelength periodic structures", 2010 IEEE Antennas and Propagation Society/URSI Symposium, Toronto, ON , Jul. 11, 2010.

* cited by examiner

HYBRID ANALOG-DIGITAL PHASED MIMO TRANSCEIVER SYSTEM

REFERENCE TO GOVERNMENT RIGHTS

This invention was made with government support under 1052628 awarded by the National Science Foundation. The government has certain rights in the invention.

BACKGROUND

The proliferation of data hungry wireless applications is driving the demand for higher power and bandwidth efficiency in emerging wireless transceivers. Two recent technological trends offer synergistic opportunities for meeting the increasing demands on wireless capacity: i) multiple-input, multiple-output (MIMO) systems that exploit multi-antenna arrays for higher capacity by simultaneously multiplexing multiple data streams, and ii) millimeter (mm) wave (mm-wave) communication systems, operating in the 60-100 gigahertz (GHz) band that provides larger bandwidths. A key advantage of mm-wave systems, and very-high frequency systems in general, is that they offer high-dimensional MIMO operation with relatively compact array sizes. In particular, there has been significant recent interest in mm-wave communication systems for high-rate (1-100 gigabit per second (Gb/s)) communication over line-of-sight (LoS) channels. Two competing designs dominate the state-of-the-art: i) traditional systems that employ continuous aperture "dish" antennas and offer high power efficiency, but no spatial multiplexing gain, and ii) MIMO systems that use discrete antenna arrays to offer a higher multiplexing gain, but suffer from power efficiency.

SUMMARY

A transmitter supporting phased MIMO communications is provided. The transmitter includes a signal processor, a plurality of feed elements, and an aperture. The signal processor is configured to simultaneously receive a plurality of digital data streams and to transform the received plurality of digital data streams into a plurality of analog signals. The number of the plurality of digital data streams is selected for transmission to a single receive antenna based on a determined transmission environment. The plurality of feed elements are configured to receive the plurality of analog signals, and in response, to radiate a plurality of radio waves toward the aperture. The aperture is configured to receive the radiated plurality of radio waves, and in response, to radiate a second plurality of radio waves toward the single receive antenna.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Figure 1:
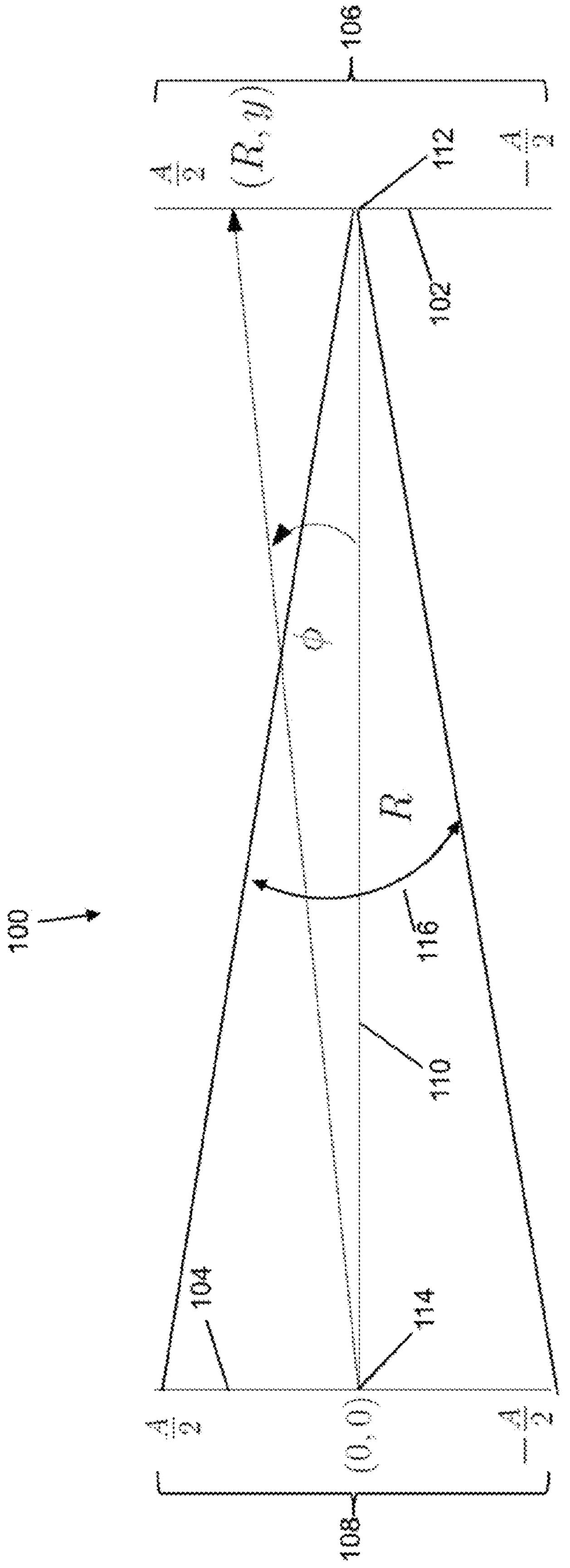
FIG. 1 depicts a one-dimensional (1D) side view of a communication system in accordance with an illustrative embodiment.

With reference to FIG. 1, a one-dimensional (1D) side view of a communication system 100 is shown in accordance with an illustrative embodiment. Communication system 100 may include a first antenna aperture 102 and a second antenna aperture 104 which include a LoS link between the antenna apertures. First antenna aperture 102 and second antenna aperture 104 also may be linked in a multipath environment. First antenna aperture 102 has a first aperture length 106 denoted A. Second antenna aperture 104 has a second aperture length 108 also denoted A. In alternative embodiments, first antenna aperture 102 and second antenna aperture 104 may have different aperture lengths. In this case, when first antenna aperture 102 is transmitting to second antenna aperture 104, first aperture length 106 may be more explicitly denoted $A_T$ and second aperture length 108 may be more explicitly denoted $A_R$. For purposes of discussion, first antenna aperture 102 is denoted as a transmit antenna, and second antenna aperture 104 is denoted as a receive antenna though each antenna may be configured to support both functions.

First antenna aperture 102 and second antenna aperture 104 are separated by a distance 110 denoted R measured between a first centerpoint 112 of first antenna aperture 102 and a second centerpoint 114 of second antenna aperture 104. A is assumed to be much smaller than R. A maximum angular spread 116 defines the angular extent of energy intercepted by second antenna aperture 104 when energy is transmitted from first centerpoint 112 of first antenna aperture 102.

One or both of first antenna aperture 102 and second antenna aperture 104 may be mounted on moving objects such that distance 110 may change with time. As known to a person of skill in the art, the communication environment between first antenna aperture 102 and second antenna aperture 104 may fluctuate due to changes in environmental conditions such as weather, to interference sources, and to movement between first antenna aperture 102 and second antenna aperture 104 which changes the multipath environment, any of which may cause a fluctuation in the received signal-to-noise ratio even where the transmission power and other signal characteristics such as frequency, pulsewidth, etc. remain unchanged.

As known to a person of skill in the art, the wavelength of operation $\lambda_c$ is defined as $\lambda_c=c/f_c$, where c is the speed of light and $f_c$ is the carrier frequency. As an example, for $f_c\in[60, 100]$ GHz, $\lambda_c\in[3,5]$ mm. First antenna aperture 102 and second antenna aperture 104 may be continuous or quasi-continuous apertures. For a given LoS link characterized by the physical parameters $(A,R,\lambda_c)$, as in FIG. 1, continuous aperture antennas at the transmitter and the receiver can be equivalently represented by critically sampled (virtual) n-dimensional uniform linear arrays (ULAs) with antenna spacing $d=\lambda_c/2$, where $n\approx 2A/\lambda_c$ is a fundamental quantity associated with a linear aperture antenna (electrical length). In other words, the analog spatial signals transmitted or received by first antenna aperture 102 and/or second antenna aperture 104 belong to an n-dimensional signal space where n can be described as the maximum number of independent analog (spatial) modes supported by first antenna aperture 102 and/or second antenna aperture 104.

Figure 2A:
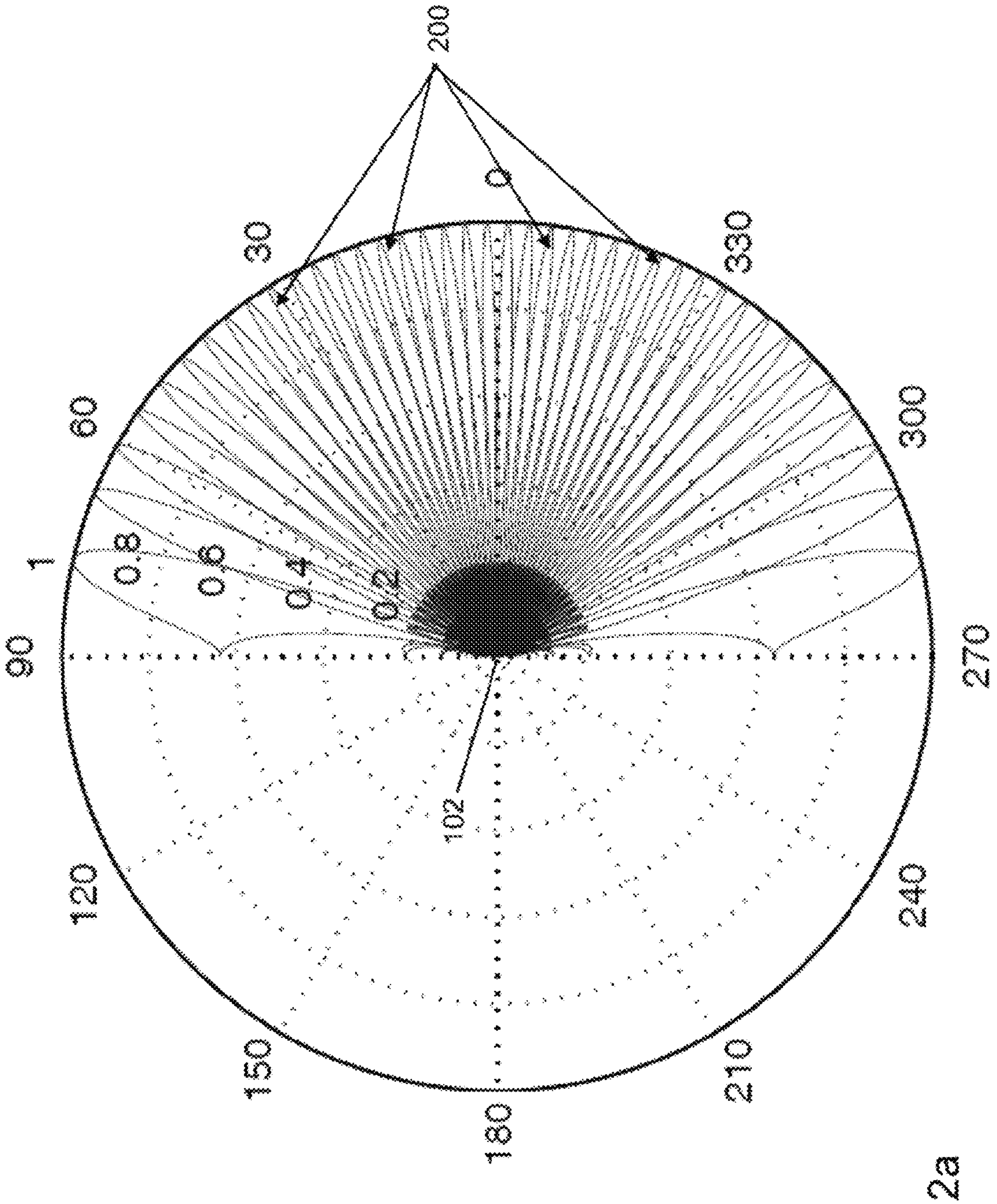
FIG. 2*a* depicts a beampattern, corresponding to orthogonal beams covering the entire spatial horizon, generated using a transmitter system of the communication system of FIG. 1 in accordance with an illustrative embodiment.
Figure 2B:
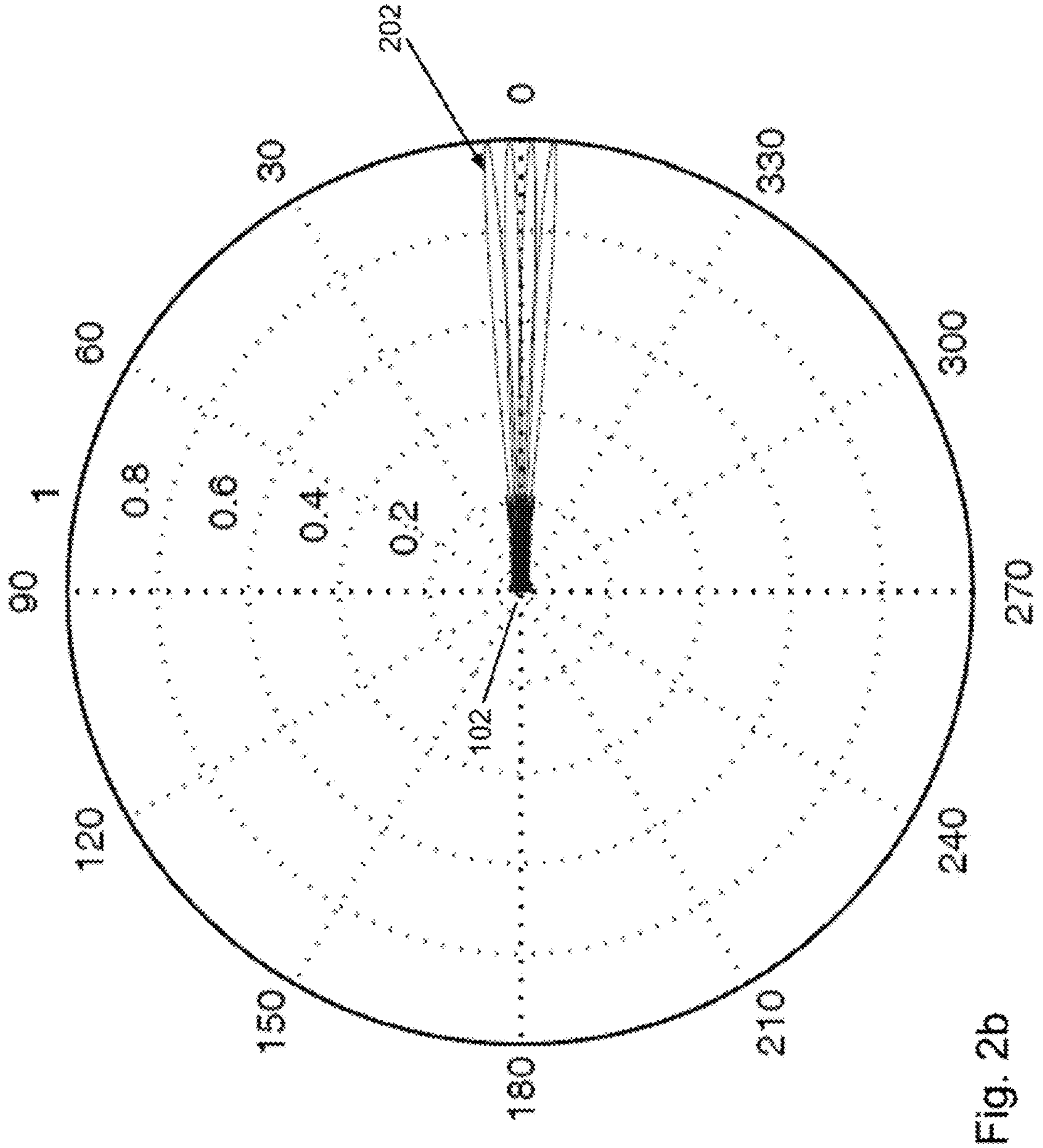
FIG. 2*b* depicts a beampattern generated using the transmitter system and intercepted by a receive antenna of the communication system of FIG. 1 in accordance with an illustrative embodiment.

Again, for simplicity, first antenna aperture 102 and second antenna aperture 104 are indicated in FIG. 1 to have the same aperture length A though this is not required. The n spatial modes can be associated with n orthogonal spatial beams 200 that cover the entire (one-sided) spatial horizon $-\pi/2\leq\phi\leq\pi/2$ in FIG. 1 as illustrated in FIG. 2*a*. However, due to the finite antenna aperture A of second antenna aperture 104, and large distance R>>A between first antenna aperture 102 and second antenna aperture 104, only a small number of modes/beams 202, $p_{max}$<<n, couple first antenna aperture 102 and second antenna aperture 104, and vice versa, as illustrated in FIG. 2*b*. $p_{max}$ can be described as the maximum number of independent digital (spatial) modes supported by the LoS link between first antenna aperture 102 and second antenna aperture 104. The number of digital modes, $p_{max}$, is a fundamental quantity related to the LoS link and can be calculated as $p_{max}\approx A^2/(R\lambda_c)$. The $p_{max}$ digital modes supported by the LoS link carry the information bearing signals from first antenna aperture 102 to second antenna aperture 104 and govern the link capacity. In other words, the information bearing signals in the LoS link lie in a $p_{max}$-dimensional subspace of the n-dimensional spatial signal space associated with first antenna aperture 102 and second antenna aperture 104.

Figure 3:
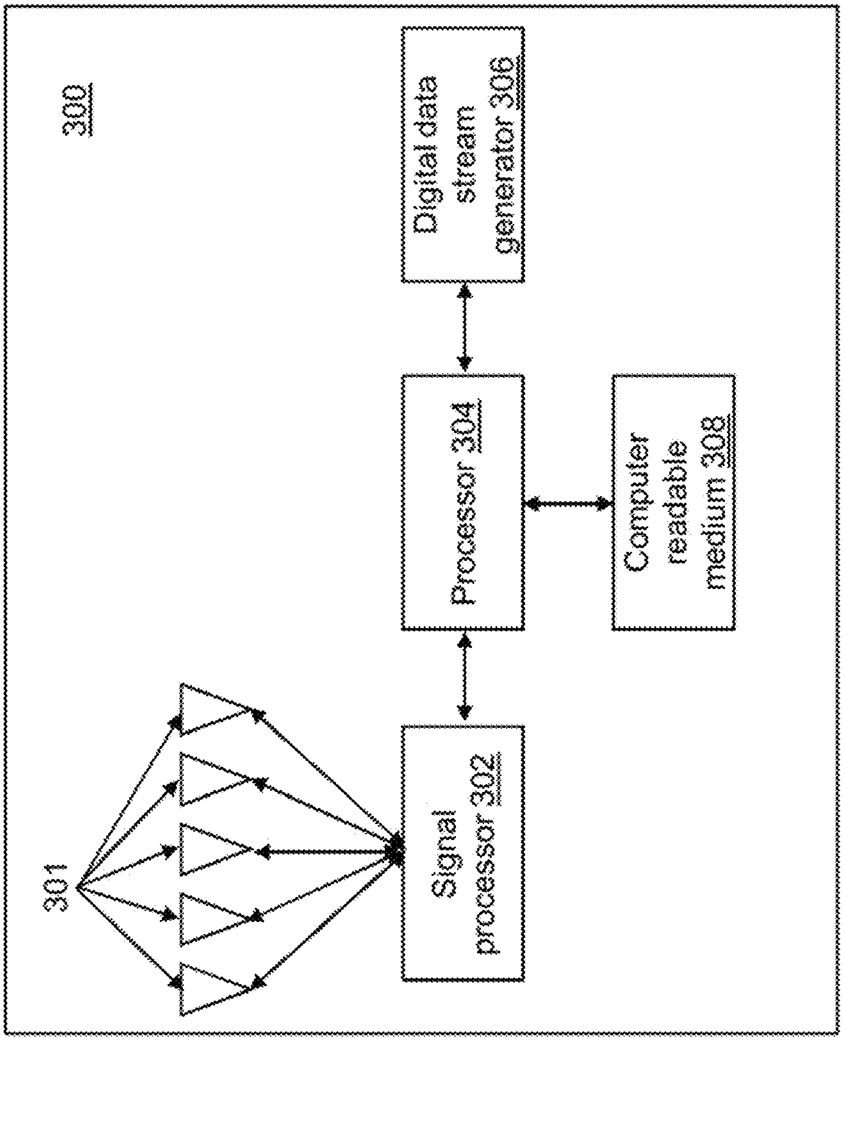
FIG. 3 depicts a block diagram of the transmitter system in accordance with an illustrative embodiment.

FIG. 3 shows a block diagram of a transmitter system 300 in accordance with an illustrative embodiment. A receiver system may also use a similar architecture as known to a person of skill in the art. Transmitter system 300 may include a plurality of feed elements 301, a signal processor 302, a processor 304, a digital data stream generator 306, and a computer-readable medium 308. Different and additional components may be incorporated into transmitter system 300. Components of transmitter system 300 may be integrated to form a single component. For example, signal processor 302 and processor 304 may be integrated to form a single processor.

The plurality of feed elements 301 may be arranged to form a uniform or a non-uniform linear array, a rectangular array, a circular array, a conformal array, etc. A feed element of the plurality of feed elements 301 may be a dipole antenna, a monopole antenna, a helical antenna, a microstrip antenna, a patch antenna, a fractal antenna, a feed horn, a slot antenna, etc. The plurality of feed elements 301 receive a plurality of analog signals, and in response, radiate a plurality of radio waves toward an aperture (not shown in FIG. 3). In an illustrative embodiment, the aperture is a lens and the plurality of feed elements 301 are mounted on a focal surface (1D or two-dimensional (2D)) relative to the lens.

Signal processor 302 forms a plurality of analog signals sent to individual feed elements of the plurality of feed elements 301. Signal processor 302 may be implemented as a special purpose computer, logic circuits, or hardware circuits and thus, may be implemented in hardware, firmware, software, or any combination of these methods. Signal processor 302 may receive data streams in analog or digital form. Signal processor 302 may implement a variety of well-known processing methods, collectively called space-time coding techniques, which can be used for encoding information into p digital inputs $\{x_2(i)\}$. In the simplest case for spatial multiplexing $x_e(I)$, i=1, . . . p represent p independent digital data streams. Signal processor 302 further may perform one or more of converting a data stream received from processor 304 from an analog to a digital form and vice versa, encoding the data stream, modulating the data stream, up-converting the data stream to a carrier frequency, performing error detection and/or data compression, Fourier transforming the data stream, inverse Fourier transforming the data stream, etc. In a receiving device, signal processor 302 determines the way in which the signals received by the plurality of feed elements 301 are processed to decode the transmitted signals from the transmitting device, for example, based on the modulation and encoding used at the transmitting device.

Processor 304 executes instructions that may be written using one or more programming language, scripting language, assembly language, etc. The instructions may be carried out by a special purpose computer, logic circuits, or hardware circuits. Thus, processor 304 may be implemented in hardware, firmware, software, or any combination of these methods. The term "execution" is the process of running an application or the carrying out of the operation called for by an instruction. Processor 304 executes instructions. Transmitter system 300 may have one or more processors that use the same or a different processing technology.

Digital data stream generator 306 may be an organized set of instructions or other hardware/firmware component that generates one or more digital data streams for transmission wirelessly to a receiving device. The digital data streams may include any type of data including voice data, image data, video data, alpha-numeric data, etc.

Computer-readable medium 308 is an electronic holding place or storage for information so that the information can be accessed by processor 304 as known to those skilled in the art. Computer-readable medium 310 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., CD, DVD, . . . ), smart cards, flash memory devices, etc. Transmitter system 300 may have one or more computer-readable media that use the same or a different memory media technology.

Figure 4:
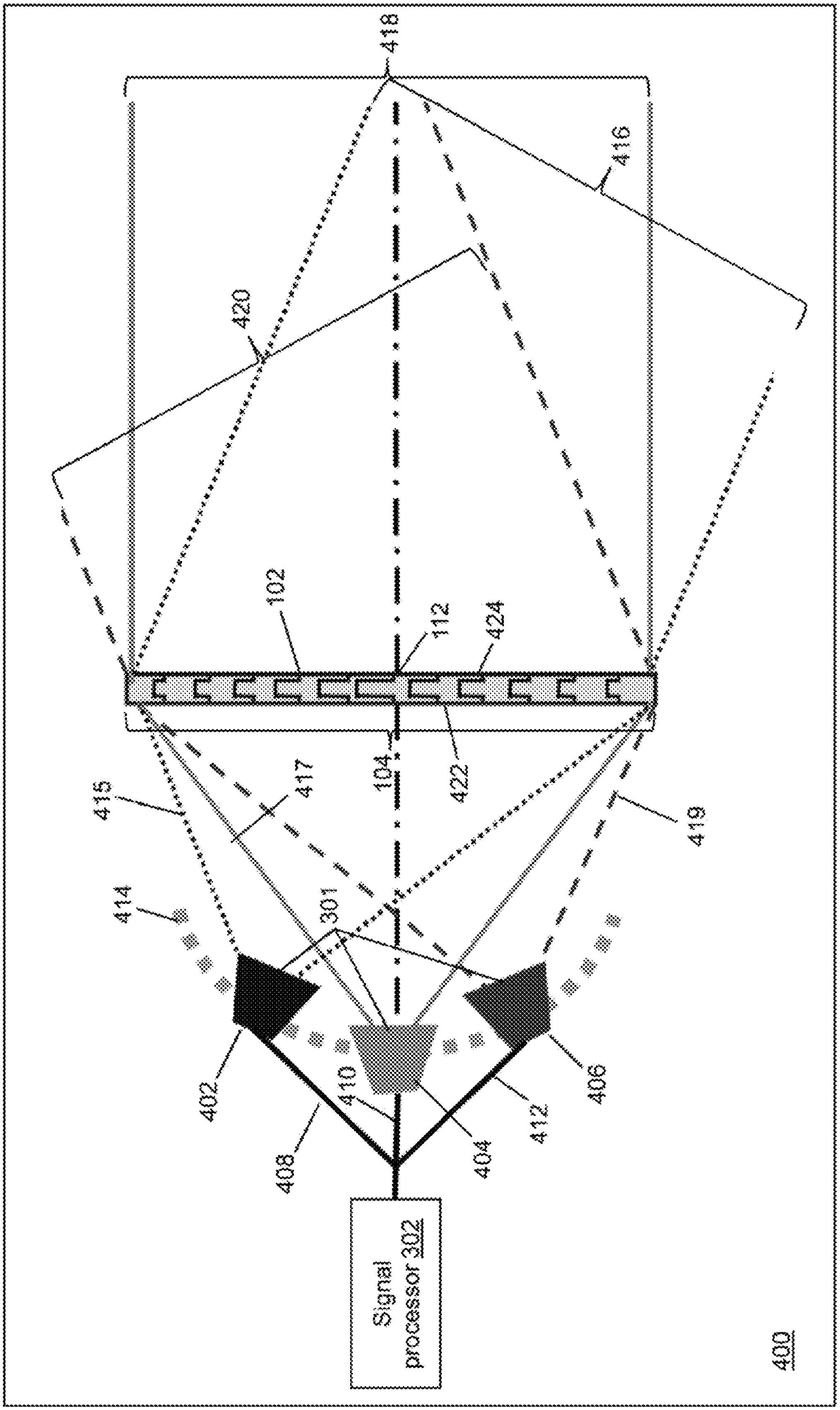
FIG. 4 depicts a one-dimensional (1D) side view of the transmitter system in accordance with a first illustrative embodiment.

FIG. 4 shows a schematic side view of a transmitter 400 in accordance with an illustrative embodiment. A receiver may also use a similar architecture as known to a person of skill in the art. Transmitter 400 may include signal processor 302, the plurality of feed elements 301, and first antenna aperture 102. In the illustrative embodiment of FIG. 4, the plurality of feed elements 301 include a first feed element 402, a second feed element 404, and a third feed element 406 mounted on a focal surface 414 relative to first antenna aperture 102 which acts as a lens. The number of the plurality of feed elements 301 may be greater than or less than three.

Transmitter 400 is configured to perform two transforms. A digital transform $U_e$ maps the p independent digital symbols (corresponding to p simultaneous data streams) into n analog symbols that excite n feeds on focal surface 414 of first antenna aperture 102. The number of data streams p can be anywhere in the range from 1 to $p_{max}$. The number of data streams p can be selected based on a characteristic of the communication link. For example, the characteristic of the communication link may be the signal-to-noise ratio. For example, a table may define various values for p based on threshold values of the signal-to-noise ratio. As another example, if the transmitter or receiver is moving, a lower p may be used. An analog transform $U_a$ represents the action of first antenna aperture 102 and propagation from the plurality of feed elements 301 to first antenna aperture 102, which effectively maps the n analog signals on focal surface 414 to the spatial signals radiated by first antenna aperture 102.

Thus, signal processor 302 maps the digital data streams received from processor 304 into n feed signals, $x_a(i)$, i=1, . . . , n, via a digital transform $U_e$. The n feed signals excite n feed elements of the plurality of feed elements 301. For example, a first feed signal is sent to first feed element 402 using a first transmission line 408, a second feed signal is sent to second feed element 404 using a second transmission line 410, and a third feed signal is sent to third feed element 406 using a third transmission line 412. In an illustrative embodiment, where $p=p_{max}$, the first feed signal causes first feed element 402 to radiate a first radio wave 415 toward a first side 422 of first antenna aperture 102. In response, a second side 424 of first antenna aperture 102 radiates a second radio wave 416 toward a first receive antenna. Similarly, the second feed signal causes second feed element 404 to radiate a third radio wave 417 toward first side 422 of first antenna aperture 102. In response, second side 424 of first antenna aperture 102 radiates a fourth radio wave 418 toward a second receive antenna. Similarly, the third feed signal causes third feed element 406 to radiate a fifth radio wave 419 toward first side 422 of first antenna aperture 102. In response, second side 424 of first antenna aperture 102 radiates a sixth radio wave 420 toward a third receive antenna. First receive antenna, second receive antenna, and/or third receive antenna may be the same or different antennas.

A digital-to-analog (D/A) conversion, including up-conversion to a passband at $f_c$ is done at the output of $U_e$. The complexity of the D/A interface is on the order of $p_{max}$<<n, rather than n as in a conventional phased-array-based implementation. The analog (up converted) signals on focal surface 414 excite the n analog spatial modes on the continuous or quasi-continuous radiating aperture of first antenna aperture 102, via the analog transform $U_a$. The analog signals on first antenna aperture 102 are represented by their critically sampled version x(i), i=1, . . . , n.

A subset of n signals is received on focal surface 414 of second antenna aperture 104, down-converted, and converted into baseband digital signals via an analog-to-digital (A/D) converter. The complexity of the ND interface, as in the case of the transmitter, is again on the order of $p_{max}$<<n, rather than n as in a conventional phased-array based design using digital beamforming. The digital signals are processed appropriately, using any of a variety of well-known algorithms (e.g. maximum likelihood) to recover an estimate, $\hat{x}_e(i)$, i=1, . . . , p of the transmitted digital signals. The nature of decoding/estimation algorithms at the receiver is dictated by the nature of the digital encoding at the transmitter.

Figure 5:
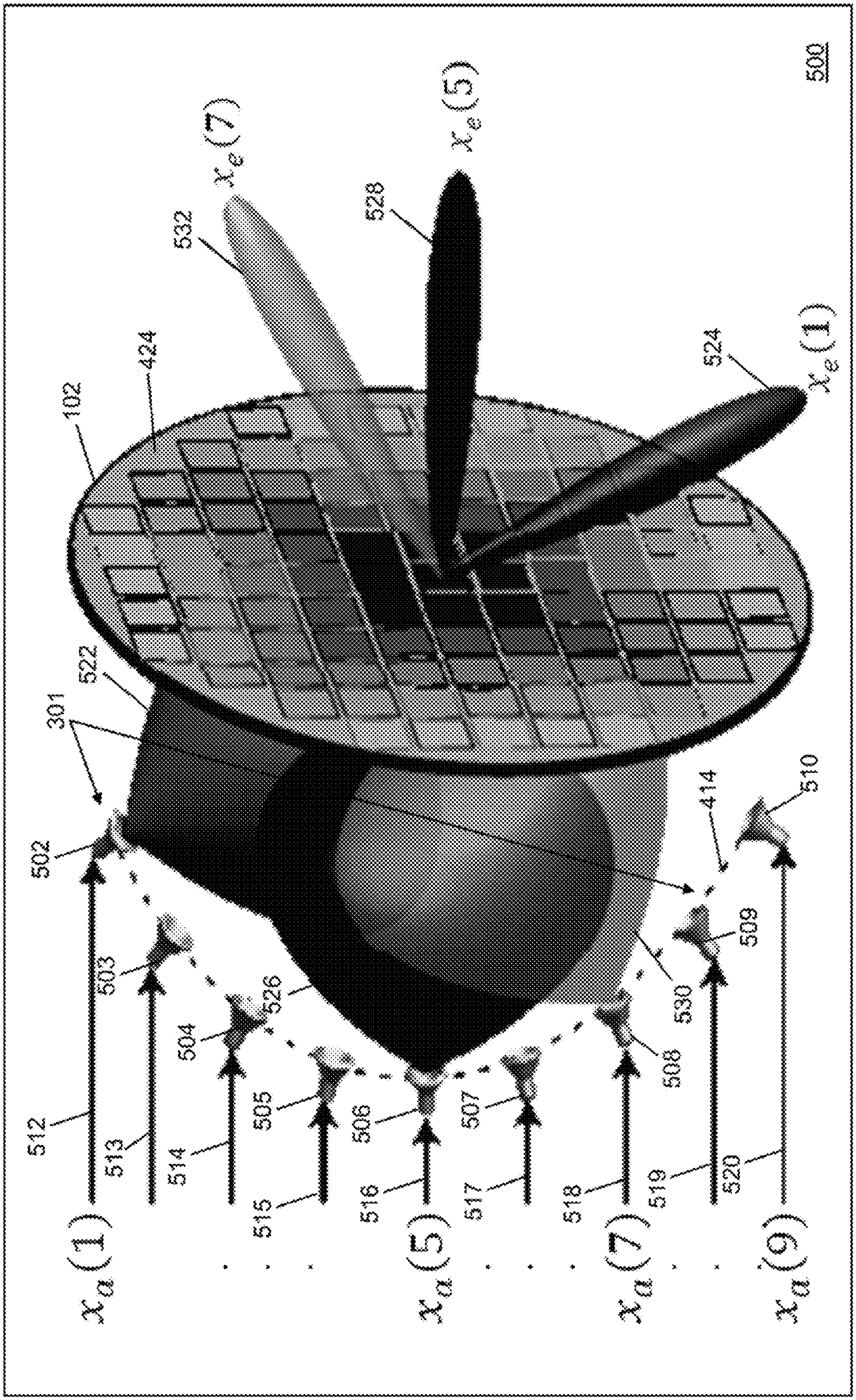
FIG. 5 depicts a one-dimensional (1D) side view of the transmitter system in a first mode in accordance with a second illustrative embodiment.

As another example, FIG. 5 shows a second schematic side view of a transmitter 500 in accordance with an illustrative embodiment. In the illustrative embodiment of FIG. 5, the plurality of feed elements 301 of transmitter 500 include a first feed element 502, a second feed element 503, a third feed element 504, a fourth feed element 505, a fifth feed element 506, a sixth feed element 507, a seventh feed element 508, an eighth feed element 509, and a ninth feed element 510 mounted on focal surface 414 relative to first antenna aperture 102 which acts as a lens. A first feed signal is sent to first feed element 502 using a first transmission line 512, a second feed signal is sent to fifth feed element 506 using a fifth transmission line 516, and a third feed signal is sent to seventh feed element 508 using a seventh transmission line 518. Other transmission lines 513, 514, 515, 517, 519, 520 connect second feed element 503, third feed element 504, fourth feed element 505, sixth feed element 507, eighth feed element 509, and ninth feed element 510, respectively, to signal processor 302 for receipt by the feed elements 503, 504, 505, 507, 509, 510 of a feed signal when appropriate. In an illustrative embodiment, where $p=p_{max}$, the first feed signal causes first feed element 502 to radiate a first radio wave 522 toward a first side 422 of first antenna aperture 102. In response, second side 424 of first antenna aperture 102 radiates a second radio wave 524 toward a first receive antenna. Similarly, the second feed signal causes fifth feed element 506 to radiate a third radio wave 526 toward first side 422 of first antenna aperture 102. In response, second side 424 of first antenna aperture 102 radiates a fourth radio wave 528 toward a second receive antenna. Similarly, the third feed signal causes seventh feed element 508 to radiate a fifth radio wave 530 toward first side 422 of first antenna aperture 102. In response, second side 424 of first antenna aperture 102 radiates a sixth radio wave 532 toward a third receive antenna. First receive antenna, second receive antenna, and/or third receive antenna may be the same or different antennas.

With continuing reference to FIG. 1, the LoS channel in the 1D setting is depicted. The transmitter and receiver consist of a continuous linear aperture of length A and are separated by a distance R>>A. The center of the receiver array serves as the coordinate reference: the receiver array is described by the set of points $\{(x, y): x=0, -A/2 \le y\ A/2\}$ and the transmitter array is described by {(x, y): x=R, −A/2≤y≤A/2}. While the LoS link can be analyzed using a continuous representation, a critically sampled system description, with spacing $d=\lambda_c/2$, results in no loss of information and provides a convenient finite-dimensional system description.

For a given sample spacing d, the point-to-point communication link in FIG. 1 can be described (in complex baseband) by an n×n MIMO system $$r=Hx+w \tag{1}$$

where x is the n-dimensional complex transmitted signal, r is the n-dimensional complex received signal, w is the complex additive white Gaussian noise (AWGN) vector with unit variance, H is the n×n complex channel matrix, and the dimension of the system is given by $$n=\left\lfloor \frac{A}{d} \right\rfloor. \tag{2}$$

For critical spacing $$d=\frac{\lambda_c}{2},\ n\approx 2A/\lambda_c,$$

which represents the maximum number of independent spatial (analog) modes excitable on the apertures.

The fundamental performance limits of the LoS link are governed by the eigenvalues of the channel matrix H. Using the following convention for the set of symmetric indices for describing a discrete signal of length n $$\Im 2(n)=\{i-(n-1)/2 : i=0, \ldots, n-1\} \tag{3}$$

which corresponds to an integer sequence passing through 0 for n odd and a non-integer sequence that does not pass through 0 for n even. It is convenient to use the spatial frequency (or normalized angle) θ that is related to the physical angle ϕ as $$\theta=\frac{d}{\lambda_c}\sin\phi. \tag{4}$$

The beamspace channel representation is based on n-dimensional array response/steering (column) vectors, $a_n(\theta)$, that represent a plane wave associated with a point source in the direction θ. The elements of $a_n(\theta)$, are given by $$a_{n,i}(\theta)=e^{-j2\pi\theta i}, i\in \Im(n) \tag{5}$$

a(θ) are periodic in B with period 1 and $$\begin{aligned} a_n^H(\theta')a_n(\theta) &= \sum_{i\in\Im(n)} a_{n,i}(\theta)a_{n,i}^*(\theta') \\ &= \sum_{i\in\Im(n)} e^{-j2\pi(\theta-\theta')n} \\ &= \frac{\sin(\pi n(\theta-\theta'))}{\sin(\pi(\theta-\theta'))} \triangleq f_n(\theta-\theta') \end{aligned} \tag{6}$$

where $f_n(\theta)$ is the Dirichlet sinc function, with a maximum of n at θ=0, and zeros at multiples of $\Delta\theta_o$, where $$\Delta\theta_o=\frac{1}{n}\approx\frac{d}{A}\Longleftrightarrow\Delta\phi_o\approx\frac{\lambda_c}{d}\Delta\theta_o=\frac{\lambda_c}{A} \tag{7}$$

which is a measure of the spatial resolution or the width of a beam associated with an n-element phased array.

The n-dimensional signal spaces, associated with the transmitter and receiver arrays in an n×n MIMO system, can be described in terms of the n orthogonal spatial beams represented by appropriately chosen steering/response vectors $a_n(\theta)$ defined in equation (6). For an n-element ULA, with n=A/d, an orthogonal basis for the n-dimensional complex signal space can be generated by uniformly sampling the principal period θ∈[−½, ½] with spacing $\Delta\theta_o$. That is, $$U_n=\frac{1}{\sqrt{n}}[a_n(\theta_i)]_{i\in\Im(n)},\quad \theta_i=i\Delta\theta_o=\frac{i}{n}=i\frac{d}{A} \tag{8}$$

is an orthogonal discrete Fourier transform (DFT) matrix with $U_n^H U_n=U_n U_n^H=I$. For critical spacing, $d=\lambda_c/2$, the orthogonal beams corresponding to the columns of $U_n$, cover the entire range for physical angles Φ∈[−π/2, π/2] as shown in FIG. 2*a*.

For developing the beamspace channel representation, the beam direction θ at the receiver is related to points on the transmitter aperture. As illustrated in FIG. 1, a point y on the transmitter array represents a plane wave impinging on the receiver array from the direction ϕ≈ sin(ϕ) with the corresponding θ given by equation (4)

$$\sin(\phi)=\frac{y}{\sqrt{R^2+y^2}}\approx\frac{y}{R}\Leftrightarrow\theta=\frac{dy}{\lambda_c R} \tag{9}$$

Using equation (9), the following correspondence between the sampled points on the transmitter array and the corresponding angles subtended at the receiver array is obtained $$y_i=id\Leftrightarrow\theta_i=i\frac{d^2}{R\lambda_c},\quad i\in\Im(n) \tag{10}$$

which for critical sampling, $d=\lambda_c/2$, reduces to $$y_i=i\frac{\lambda_c}{2}\Leftrightarrow\theta_i=i\frac{\lambda_c}{4R},\ i\in\Im(n). \tag{11}$$

The n columns of matrix H are given by a (θ) corresponding to the $\theta_i$ in equation (11); that is, $$H=[a_n(\theta_i)]_{i\in\Im(n)},\ \theta_i=i\Delta\theta_{ch}=i\frac{\lambda_c}{4R}. \tag{12}$$

The total channel power is defined as $$\sigma_c^2=tr(H^H H)=n^2. \tag{13}$$

For the LoS link shown in FIG. 1, the link capacity is directly related to the rank of H which is in turn related to the number of orthogonal beams from the transmitter that lie within the aperture of the receiver array, which can be referred to as the maximum number of digital modes, $p_{max}$. With reference to FIG. 2*a*, the far-field beampatterns corresponding to the n orthogonal beams are shown that cover the entire spatial horizon as defined in equation (8) for n=40. Of these beams, only $p_{max}=4$ couple to the receiver array with a limited aperture, as illustrated in FIG. 2*b*. The number $p_{max}$ can be calculated as $$p_{max} = \frac{2\theta_{max}}{\Delta\theta_o} = 2\theta_{max} n = 2\theta_{max}\frac{A}{d} \approx \frac{A^2}{R\lambda_c} \tag{14}$$

where $\theta_{max}$ denotes the (normalized) angular spread subtended by the receiver array at the transmitter and using equations (4) and (9) and noting that $$\sin(\phi_{max}) \approx \frac{A}{2R},$$

where $\phi_{max}$ denotes the physical (one-sided) angular spread subtended by the receiver array at the transmitter.

$p_{max}$ as defined in equation (14) is a fundamental link quantity that is independent of the antenna spacing used. For a continuous or quasi-continuous aperture system $d=\lambda_c/2$. For a conventional MIMO system using $p_{max}$ antennas with spacing $d_{ray}$ and plugging $A=p_{max}d$ into equation (14) leads to the required (Rayleigh) spacing $$d_{ray} = \sqrt{\frac{R\lambda_c}{p_{max}}}.$$

The maximum number of digital modes, $p_{max}$, defined in equation (14) is a baseline indicator of the rank of the channel matrix H. The actual rank depends on the number of dominant eigenvalues of $H^H H$.

Given a static point-to-point LoS channel, as shown in FIG. 1, for which the critically sampled channel matrix H in equation (12) is deterministic and assumed to be completely known at the transmitter and the receiver, it is well known that the capacity-achieving input is Gaussian and is characterized by the eigenvalue decomposition of the n×n transmit covariance matrix $$\Sigma_T = H^H H = V^{\wedge} V^H \tag{15}$$

where V is the matrix of eigenvectors and $\Lambda=\mathrm{diag}(\lambda_1, \ldots, \lambda_n)$ is the diagonal matrix with $\Sigma_i\lambda_i=\sigma_c^2=n^2$. In particular, the capacity-achieving input vector x in equation (1) is characterized as $C_N(0, V\,\Lambda^{\wedge}V^H)$ where $\Lambda_s=\mathrm{diag}(p_1, \ldots, p_n)$ is the diagonal matrix of eigenvalues of the input covariance matrix $E[xx^H]$ with $\mathrm{tr}(\Lambda_s)=\Sigma_i\rho_i=\rho$.

Figure 6:
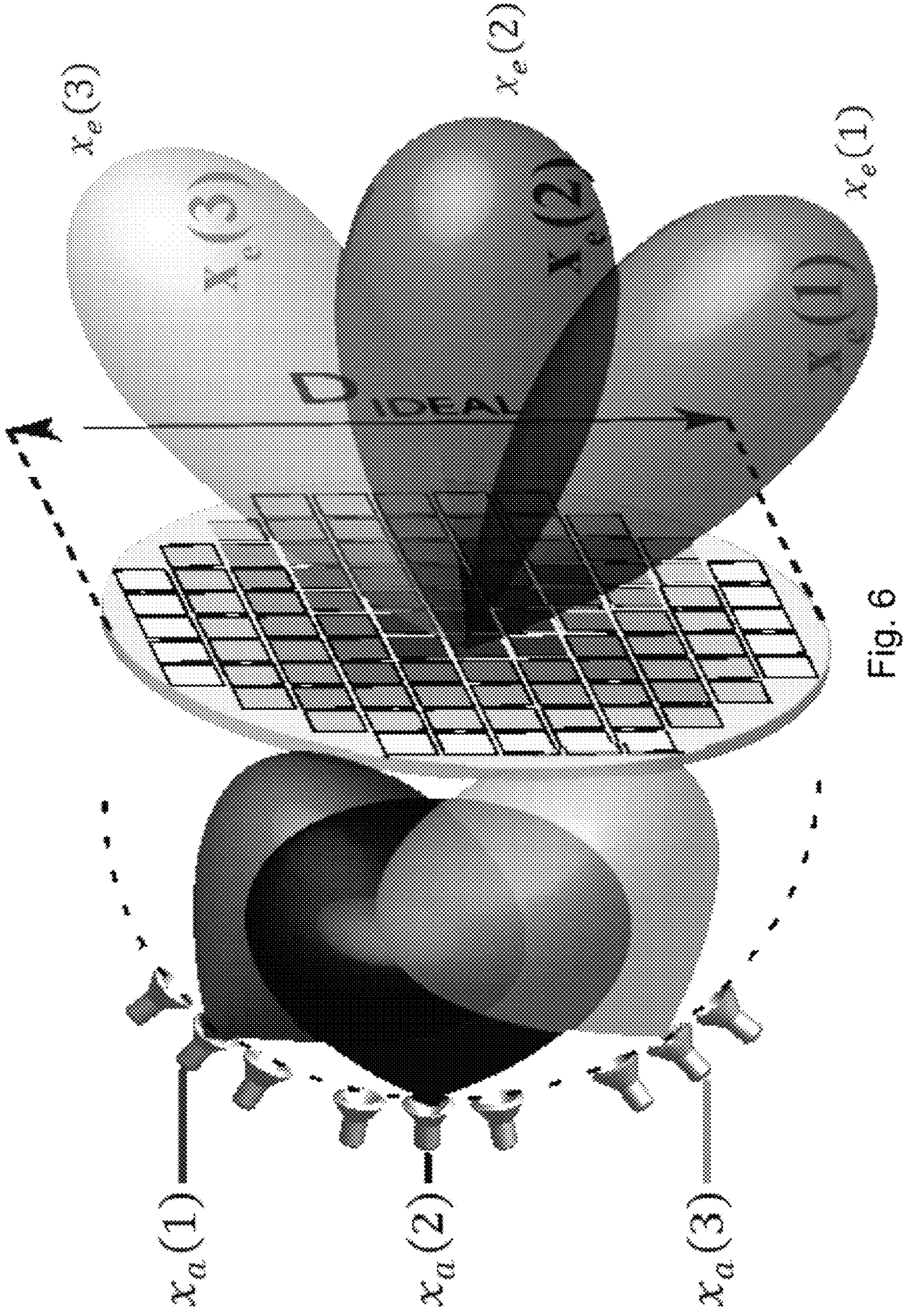
FIG. 6 depicts a one-dimensional (1D) side view of the transmitter system in a second mode in accordance with the second illustrative embodiment.

The n×p digital transform $U_e$ represents mapping of the p, $1 \le p \le p_{max}$, independent digital signals onto focal surface 414, which is represented by n samples. For $p=p_{max}$, the digital component is the identity transform. For $p<p_{max}$, the digital transform effectively maps the independent digital signals to the focal surface 414 so that p data streams are mapped onto p beams with wider beamwidths (covering the same angular spread—subtended by the receiver array aperture). Wider beamwidths, in turn, are attained via excitation of part of first antenna aperture 102 as shown with reference to FIG. 6.

For a given $p \in [1, 2, \ldots, p_{max}\}$ representing the number of independent digital data streams, an oversampling factor is defined as $$n_{os}(p)=p_{max}/p, p=1, \ldots, p_{max} \tag{16}$$

The p digital streams are mapped into p beams that are generated by a reduced aperture $A(p)=A/n_{os}$ corresponding to $$n_a(p)=n/n_{os}=n_p/p_{max} \tag{17}$$

(fewer) Nyquist samples. The resulting (reduced) beamspace resolution is given by $$\Delta\theta(p)=1/n_a(p)=(1/n)*(p_{max}/p)=\Delta\theta_o*n_{os}(p) \tag{18}$$

where $\Delta\theta_o=1/n$ is the spatial resolution afforded by the full aperture. The reduced beamspace resolution corresponds to a larger beamwidth for each beam.

The n×p digital transform $U_e$ consists of two components: $U_e=U_2U_1$. The $n_a(p)$×p transform $U_1$ represents the beamspace to aperture mapping for the p digital components corresponding to an aperture with $n_a(p)$ (Nyquist) samples:

$$U_1(l, m) = \frac{1}{\sqrt{n_a(p)}} e^{-j\frac{2\pi lm}{n_a(p)}} = \sqrt{\frac{n_{os}}{n}}\, e^{-j\frac{2\pi lmn_{os}}{n}}, \tag{19}$$

where $l \in \beth(n_a(p))$, $m \in \beth(p)$. The $n \times n_a(p)$ mapping $U_2$ represents an oversampled—by a factor $n/n_a(p)=n_{os}$—inverse DFT (IDFT) of the $n_a(p)$ dimensional (spatial domain) signal at the output of $U_1$:

$$U_2(l, m) = \frac{1}{\sqrt{n}} e^{j\frac{2\pi lm}{n}},\ l \in \beth(n),\ m \in \beth(n_a(p)) \tag{20}$$

For a given n, $p_{max}$, and p, the n×p composite digital transform, $U_e$, can be expressed as $$\begin{aligned} U_e(l, m) &= (U_2U_1)(l, m) \\ &= \sum_{i \in \beth(n_a(p))} U_2(l, i)U_1(i, m) \\ &= \frac{1}{\sqrt{n_{os}}}\frac{1}{n_a}\sum_{i \in \beth(n_a)} e^{j2\pi\left(\frac{l-mn_{os}}{n_{os}}\right)\frac{i}{n_a}} \\ &= \frac{1}{n_a\sqrt{n_{os}}} f_{n_a}\left(\frac{1}{n_a}\left(\frac{l}{n_{os}} - m\right)\right), \end{aligned} \tag{21}$$

where $f_n(\cdot)$ is defined in equation (6), $l \in \beth(n)$ represent the samples of focal surface 414 and $m \in \beth(p)$ represent the indices for the digital data streams. Note that for $p=p_{max}$ ($n_a=n$, $n_{os}=1$), $U_e$ reduces to a $p_{max} \times p_{max}$ identity matrix. Even for $p<p_{max}$, only a subset of the outputs of $U_e$ are active, on the order of $p_{max}$, which can be estimated from (20).

The analog transform $U_a$ represents the analog spatial transform between focal surface 414 and first antenna aperture 102 and is a continuous Fourier transform that is affected by the wave propagation between focal surface 414 and first antenna aperture 102. However, using critical sampling, the continuous Fourier transform can be accurately approximate by an n×n DFT matrix corresponding to critical (Nyquist)–$\lambda_c/2$—sampling of first antenna aperture 102 and focal surface 414:

$$U_a(l, m) = \frac{1}{\sqrt{n}} e^{-j\frac{2\pi lm}{n}},\ l \in \beth(n),\ m \in \beth(n) \tag{22}$$

where the index l represents samples on the first antenna aperture 102 (spatial domain) and the index m represents samples on focal surface 414 (beamspace).

Figure 7B:
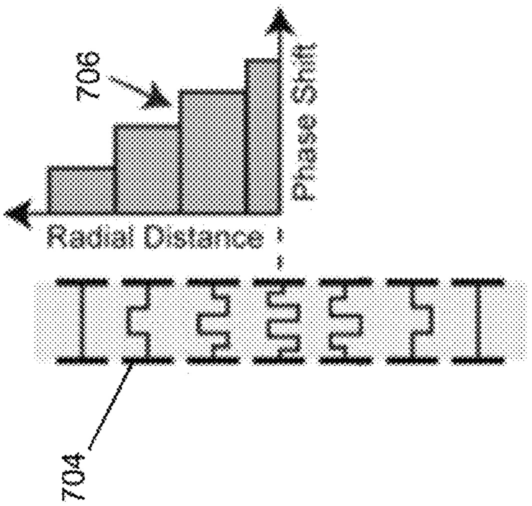
FIG. 7*b* shows a conventional microwave lens in accordance with an illustrative embodiment.
Figure 7C:
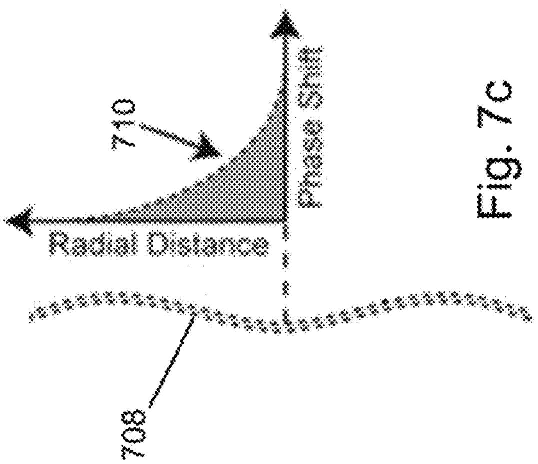
FIG. 7*c* shows a high-resolution, discrete lens array (DLA) in accordance with an illustrative embodiment.
Figure 7A:
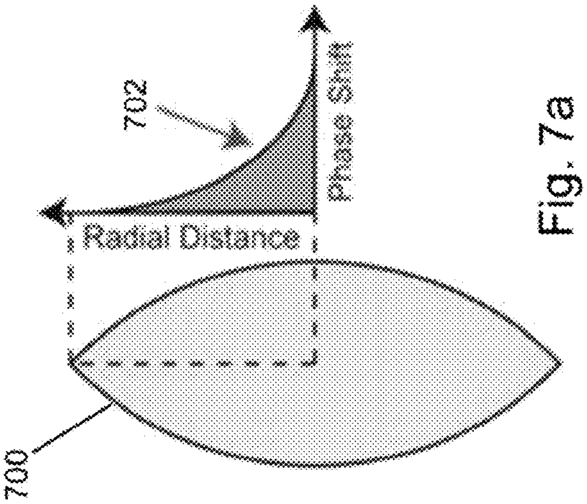
FIG. 7*a* shows a double convex dielectric lens in accordance with an illustrative embodiment.

The analog component is based on a high-resolution aperture which is continuous or approximates a continuous aperture to provide a quasi-continuous aperture that provides an approximately continuous phase shift for beam agility. For comparison and illustration, FIG. 7*a* shows a double convex dielectric lens 700, which provides a continuous phase shift curve 702 based on the radial distance from a centerpoint of double convex dielectric lens 700. FIG. 7*b* shows a conventional microwave lens 704 composed of arrays of receiving and transmitting antennas connected through transmission lines with variables lengths, which provides a discrete phase shift curve 706 based on the radial distance from a centerpoint of microwave lens 704. FIG. 7*c* shows a high-resolution, discrete lens array (DLA) 708, which provides a quasi-continuous phase shift curve 710 based on the radial distance from a centerpoint of high-resolution DLA 708. Using well-known principles from Fourier optics, in particular the relationship between the effect of lenses and mirrors, the analog component could also be realized in reflective mode, using a reflecting (focusing) aperture at the transmitter. In this case, the plurality of feed elements 301 are appropriately placed on focal surface 414 of a reflective aperture.

Figure 8B:
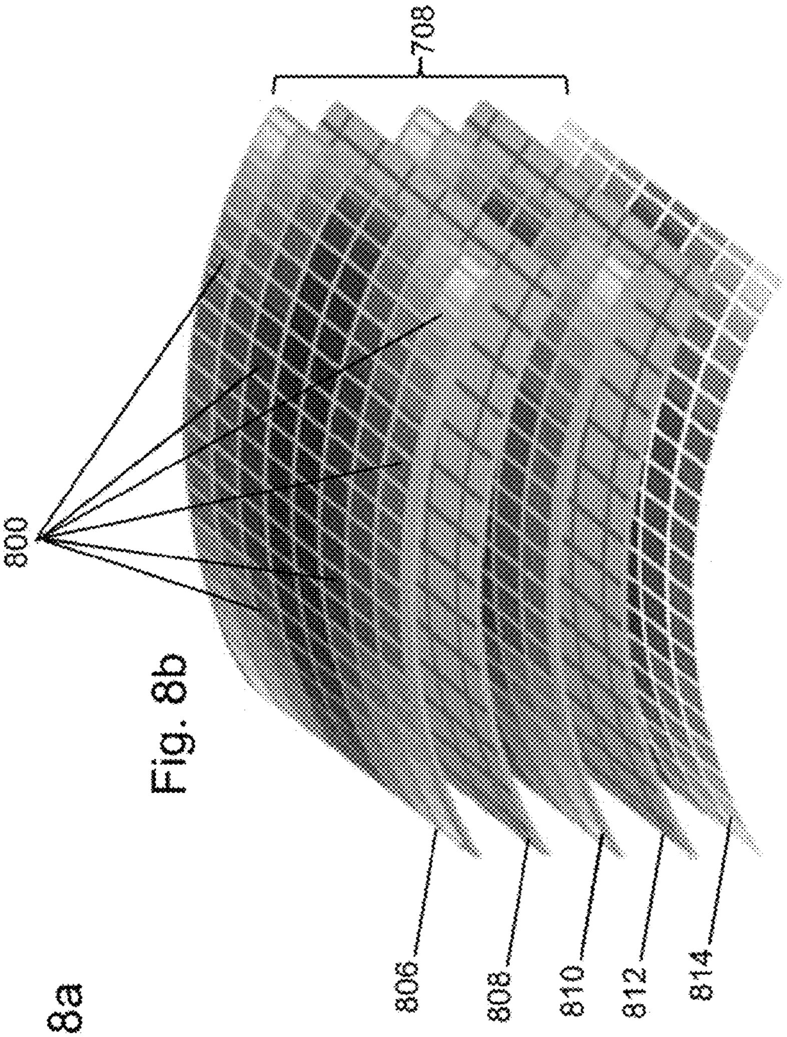
FIGS. 8*a* and 8*b* show a topology of the high-resolution DLA of FIG. 7*c* in accordance with an illustrative embodiment.
Figure 8A:
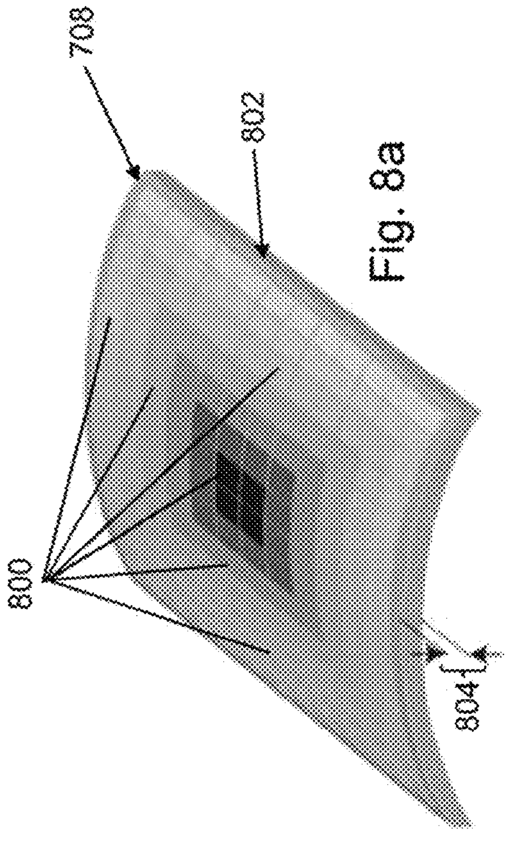

With reference to FIG. 8*a*, high-resolution DLA 708 is shown in an illustrative embodiment. High-resolution DLA 708 is composed of a plurality of spatial phase shifting elements, or pixels, 800 distributed on a plurality of layers 802 of a flexible membrane having a width 804. The physical dimensions of each pixel 800 are significantly smaller than the operational wavelength $\lambda_c$. The local transfer function of the spatial phase shifting elements 800 can be tailored to convert the electric field distribution of an incident electromagnetic (EM) wave on an input aperture to a desired electric field distribution at an output aperture. For example, high-resolution DLA 708 can be designed to convert a spherical incident wave front at its input aperture to a desired output aperture field distribution having a linear phase gradient across output aperture. Such an aperture field distribution generates a far field radiation pattern where the direction of maximum radiation is determined by the phase variation of the electric field over the output aperture. Dynamically changing the phase shift gradient changes the direction of the far field pattern and effectively steers the direction of the main beam. As long as an appropriate output aperture can be defined, the surface of high-resolution DLA 708 does not have to be planar, cylindrical, or spherical, and can assume an arbitrary (smooth) shape as shown in FIG. 7*c*.

In an illustrative embodiment, the design of the spatial phase shifting elements 800 is based on frequency selective surfaces (FSS) with non-resonant constituting elements and miniaturized unit cell dimensions. This type of FSS is henceforth referred to as the miniaturized element FSS (MEFSS). In its pass-band, a band-pass MEFSS allows a signal to pass through with little attenuation. However, based on its frequency response, the transmitted signal will experience a frequency dependent phase shift. This way, a band-pass MEFSS in its pass-band can act as a phase shifting surface (PSS) and its constituting elements (unit cells) can be effectively used as the spatial phase shifters (or pixels) of an RF/microwave lens.

In an illustrative embodiment, the MEFSS is composed of a plurality of closely spaced impedance surfaces with reactive surface impedances (either capacitive or inductive) separated from one another by ultra-thin dielectric spacers. A typical overall thickness of a 3rd-order MEFSS is $0.025\lambda_c$. Because they use non-resonant unit cells, the lattice dimensions of the sub-wavelength periodic structures can be extremely small. Typical dimensions of a pixel can be as small as $0.05\lambda_c \times 0.05\lambda_c$. In conjunction with their ultra-thin profile, this feature enables operation of high-resolution DLA 708 on curved surfaces with small to moderate radii of curvature. In this manner, the total number of spatial phase shifters per unit area ($\lambda_c^2$) can be as high as 400 elements, which results in a high resolution as compared to conventional microwave lens 704, which typically has 4 to 9 pixels per unit area, thus providing a quasi-continuous phase shift equivalent to that provided by double convex dielectric lens 700.

For example, with reference to FIG. 8*b*, high-resolution DLA 708 is comprised of a 3rd-order MEFSS and includes a first capacitive layer 806 mounted on a first inductive layer 808, which is mounted on a second capacitive layer 810, which is mounted on a second inductive layer 812, which is mounted on a third capacitive layer 814 with the reactive surface impedances of each layer itself mounted on a flexible dielectric membrane.

Figure 9:
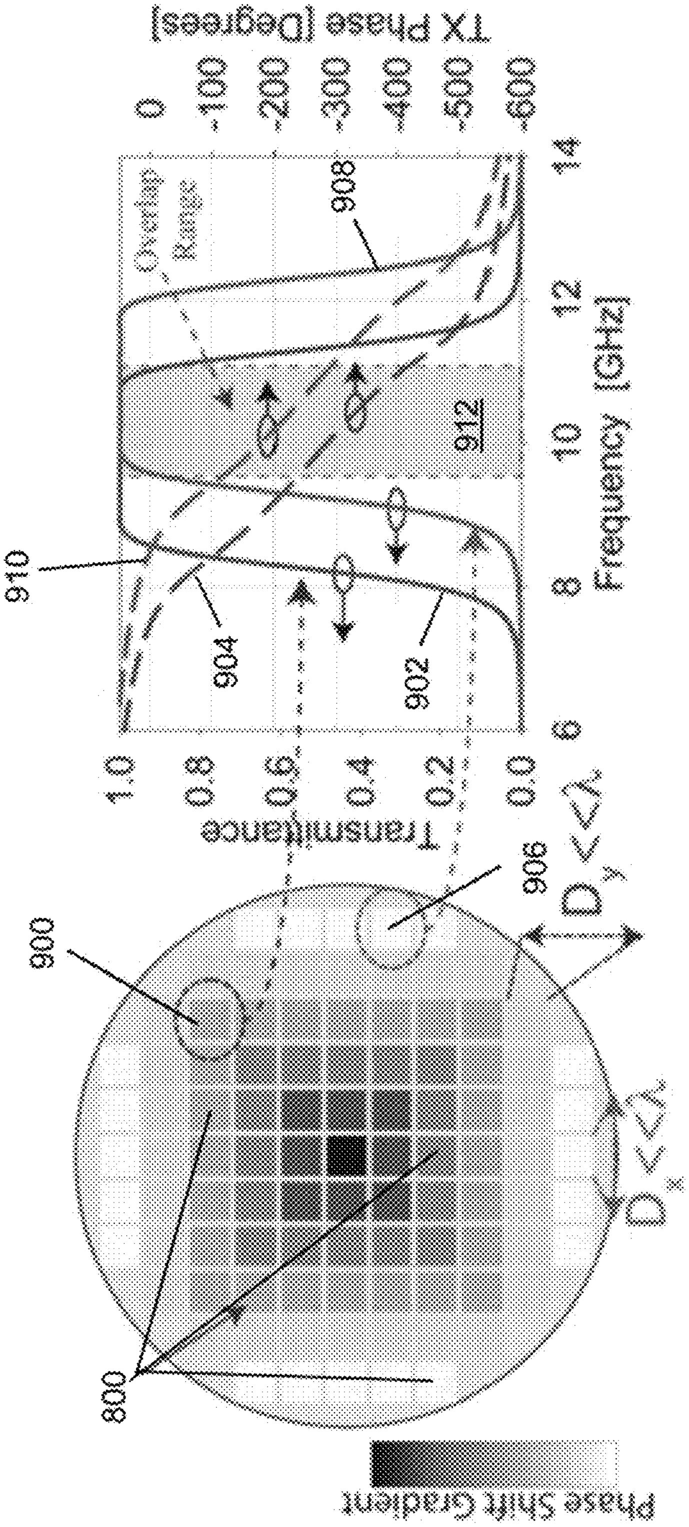
FIG. 9 shows a top view of the high-resolution DLA of FIGS. 8*a* and 8*b* and magnitude and phase responses of example pixels of the high-resolution DLA of FIGS. 8*a* and 8*b* in accordance with an illustrative embodiment.

With reference to FIG. 9, a gradual change in phase shift is provided by changing the center frequency of operation of each of the pixels 800 with respect to its neighbor, which changes both the magnitude and the phase of the pixel's transfer function. For example, a first pixel 900 has a magnitude response curve 902 and a phase response curve 904, and a second pixel 906 has a magnitude response curve 908 and a phase response curve 910. However, in a frequency band 912 where the magnitude responses overlap, only the pixel's phase response matters. Thus, by appropriately tuning the response of each pixel's transfer function, a desired phase shift gradient over the aperture can be synthesized. The operational bandwidth of the lens is determined by the range of frequencies over which the magnitude response of all pixels 800 overlap.

The achievable phase shift range, for each MEFSS, is a function of the maximum phase variation in its pass-band. For example, the phase of a transfer function of a 2nd-order MEFSS may change from +10° to −170° over the operational bandwidth of the MEFSS. Therefore, if the pixels 800 of this type of MEFSS are used as the phase shifting pixels of a lens, they can only provide relative phase shifts in the range of 0-180°, which only allows for the design of lenses with large focal lengths. This limitation, however, is alleviated if the phase shifting pixels are designed to provide a 0°-360° phase shifts in the desired frequency band.

Figures 10A, 10B, 10C:
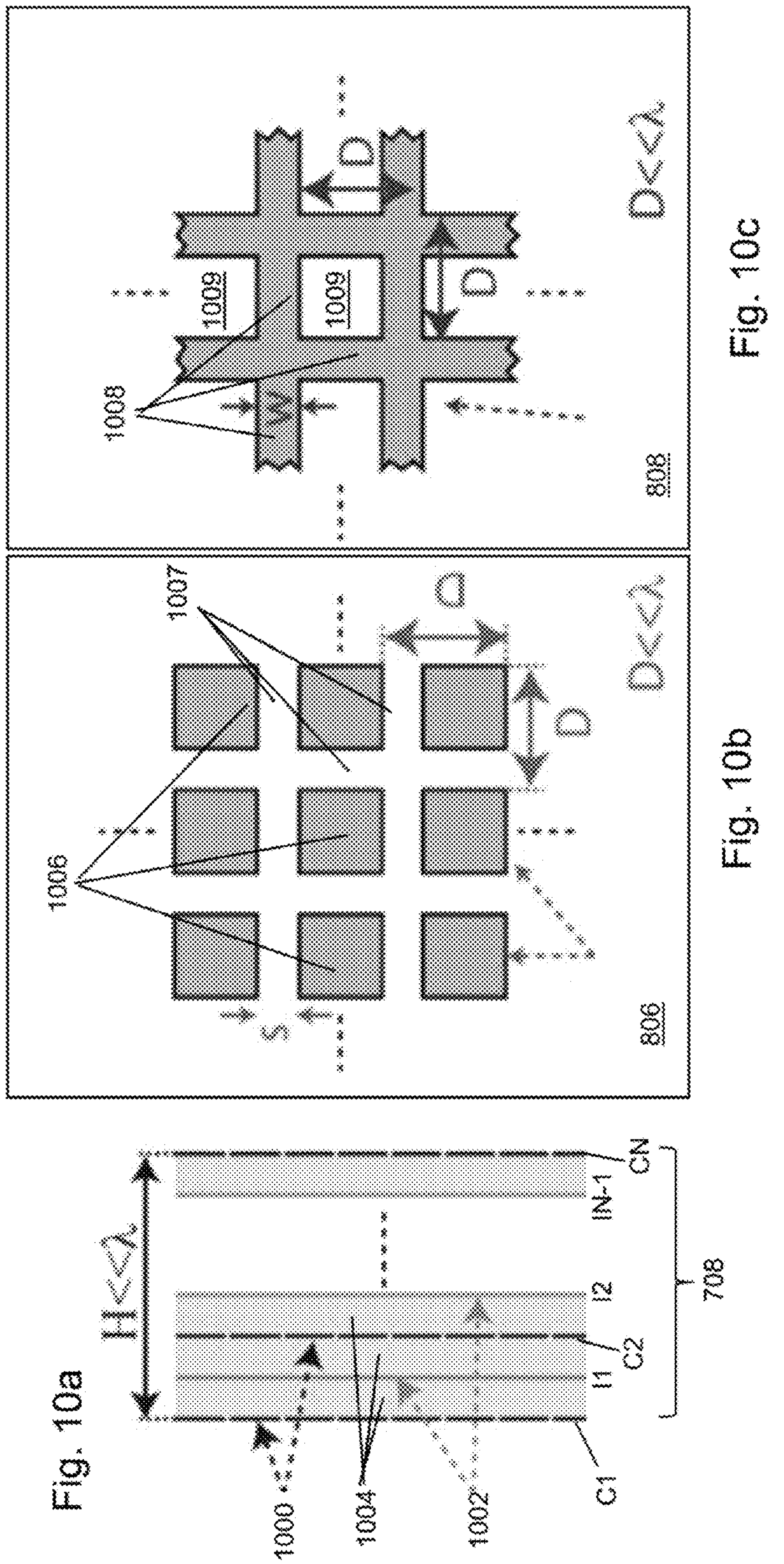
FIG. 10*a* shows a side view of a general design of the high-resolution DLA of FIGS. 8*a* and 8*b* in accordance with an illustrative embodiment.
FIG. 10*b* shows a top view of a capacitive layer of the high-resolution DLA of FIGS. 8*a* and 8*b* in accordance with an illustrative embodiment.
FIG. 10*c* shows a top view of an inductive mesh layer with sub-wavelength periodicity of the high-resolution DLA of FIGS. 8*a* and 8*b* in accordance with an illustrative embodiment.

The maximum phase variation of a given MEFSS is a function of the type of the transfer function and the order of the response (e.g. 3rd order, linear-phase, band-pass response). Therefore, to achieve a broader phase shift range, an MEFSS with a higher-order response may be used. With reference to FIG. 10*a*, a side view of a general MEFSS design of order N is shown in accordance with an illustrative embodiment. In the illustrative embodiment, high-resolution DLA 708 is composed of N capacitive layers 1000 and N−1 inductive layers 1002 separated by 2N−2, ultra-thin dielectric substrates 1004. The order of the response can be increased by increasing the number of constituting layers of high-resolution DLA 708. For example, a 3rd order MEFSS with Chebychev band-pass response has an overall electrical thickness of $0.03\lambda_c$ and provides a relative phase shift of 0°-320° range in its pass-band, and a 4th order MEFSS has a phase shift range greater than 0°-360°.

With reference to FIG. 10*b*, first capacitive layer 806 comprises a plurality of sub-wavelength capacitive patches 1006 formed on a first dielectric layer 1007 of the 2N−2, ultra-thin dielectric substrates 1004. With reference to FIG. 10*c*, first inductive layer 808 comprises an inductive wire mesh 1008 with sub-wavelength periodicity formed on a second dielectric layer 1009 of the 2N−2, ultra-thin dielectric substrates 1004.

Figure 11A:
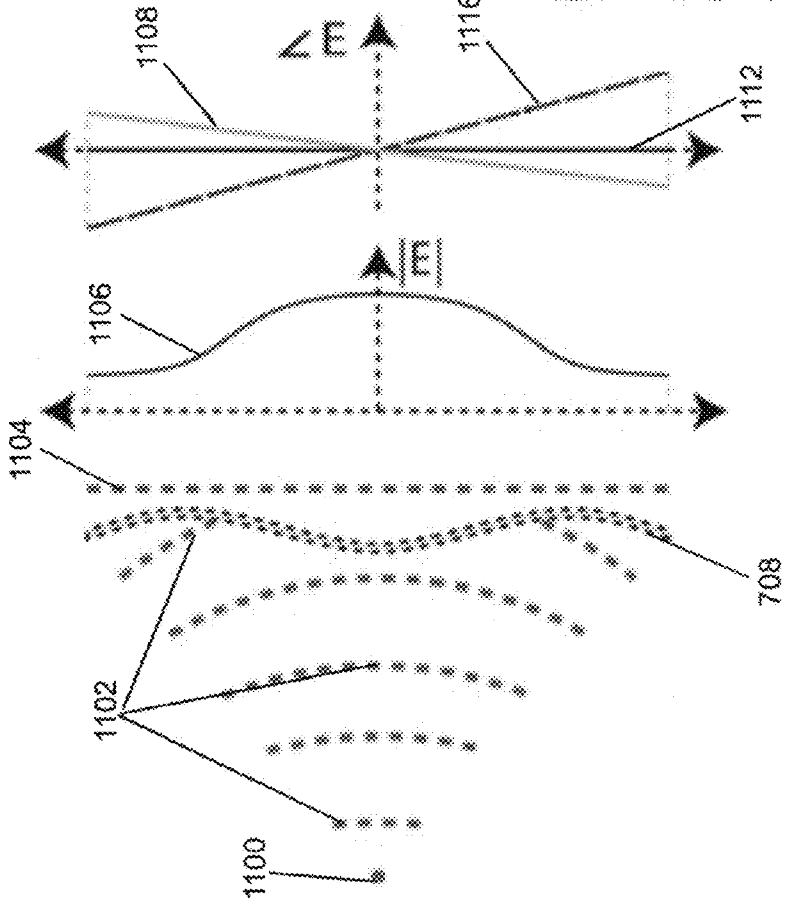
FIG. 11*a* shows a topology of the high-resolution DLA of FIGS. 8*a* and 8*b* illuminated with a simple feed antenna in accordance with an illustrative embodiment.
Figure 11B:
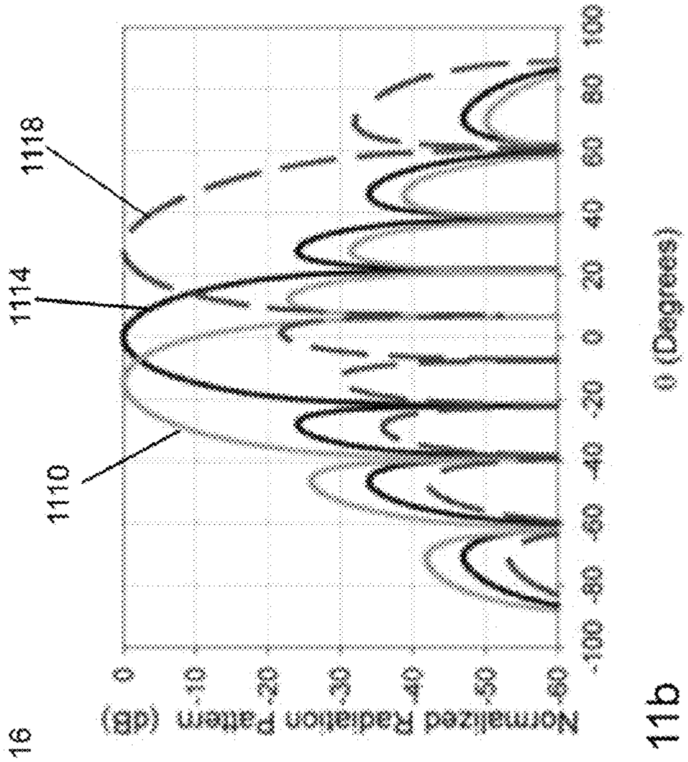
FIG. 11*b* shows radiation patterns generated using the topology of FIG. 11*a* in accordance with an illustrative embodiment.

The local transfer function of the spatial phase shifters can be tailored to convert the electric field distribution of an incident electromagnetic radio wave at the lens' input aperture to a desired electric field distribution at the output aperture. With reference to FIG. 11*a*, a feed element 1100 illuminates high-resolution DLA 708 with radio waves 1102, which creates an electric field distribution 1104 over the aperture of high-resolution DLA 708. The magnitude 1106 and phase of electric field distribution 1104 over the aperture of high-resolution DLA 708 determine its radiation properties in the far field. In particular, the phase shift gradient of the E-field distribution over the aperture determines the direction of maximum radiation of the antenna in the far field. Dynamically tuning this phase shift gradient over the antenna aperture results in scanning the antenna beam. For example, with a first phase variation 1108, a first radiation pattern 1110 is generated; with a second phase variation 1112 (no phase variation), a second radiation pattern 1114 is generated; and with a third phase variation 1116, a third radiation pattern 1118 is generated.

The n-dimensional transmit signal vector $x=[x_1, \ldots, x_n]^T$ is a sampled representation of the signals radiated by first antenna aperture 102. Furthermore, $x=U_a x_a$, where $x_a=[x_{a,1}, \ldots, x_{a,n}]^T$ is the n-dimensional representation of the (analog) signals at focal surface 414. $x_a=U_e x_e$ where $x_e=[x_{e,1}, \ldots, x_{e,p}]^T$ is the ρ-dimensional vector of digital symbols at the input of the digital transform $U_e$. For the basic transmitter architecture, $U_e$ is defined in equation (21). For the basic transmitter structure, the system equation (1) can be rewritten directly in terms of $x_e$ as $$r=HU_aU_ex_e+w=HU_{tx}x_e=H_{red}x_e \tag{23}$$

where $$U_{tx}=U_aU_e \tag{24}$$

is the n×p effective transmission matrix coupling the p-dimensional vector of input digital symbols, $x_e$, to the n-dimensional signals on first antenna aperture 102 $x=U_{tx}x_e$. It can be shown that the p column vectors of $U_{tx}$ form approximate transmit (spatial) eigenmodes of the transmit covariance matrix $\Sigma_{tx}=H^H H$ and transmitting over these eigenmodes is optimum (capacity-achieving) from a communication theoretic perspective. In other words, $U_{tx}$ enables optimal access to the $p\in\{1, 2, \ldots, p_{max}\}$ digital modes in the channel. For $p<p_{max}$, the dimension of $U_{tx}$ is reduced due to partial excitation of first antenna aperture 102. In other words, a reconfigured version of the LoS channel is in effect when $U_e$ is configured for transmitting $p<p_{max}$ digital symbols simultaneously.

The approximate eigenproperty of $U_{tx}=U_aU_e$ is more accurate for large $p_{max}$. However, for relatively small $p_{max}$, the approximation can be rather course. In this case, while $U_{tx}$ still enables access to the digital modes, the columns of $U_{tx}$ deviate from the true spatial eigenmodes. A modification of the digital transform enables transmission onto the true spatial eigenmodes of the channel. Let $\Sigma_{tx,red}$=HredHHred denote the p×p transmit covariance matrix of the reduced-dimensional n×p channel matrix in equation (23). Further, let $$\Sigma_{tx,red}=U_{red}\Lambda_{red}U_{red}^H \tag{25}$$

denote the eigendecomposition of the $\Sigma_{tx,red}$ where $U_{red}$ is the p×p dimensional matrix of eigenvectors and $\Lambda_{red}$ is a p×p diagonal matrix of (positive) eigenvalues. With the knowledge of $U_{red}$, $U_{tx}$ in equation (24) becomes $$U_{tx}=U_aU_eU_{red} \tag{26}$$

to enable transmission onto the exact p eigenmodes for the channel where $p\in\{1, 2, \ldots, p_{max}\}$, $U_e$ is the digital transform in the basic transmitter architecture defined in equation (21) and $U_{red}$ is defined via the eigendecomposition in equation (25).

The analog transform $U_a$ represents the analog spatial transform between focal surface 414 and the continuous or quasi-continuous aperture of first antenna aperture 102. The p×n digital transform $U_e$ or $U_eU_{red}$ represent mapping of the p, $1\le p\le p_{max}$, independent digital signals onto focal surface 414 of the continuous or quasi-continuous aperture of first antenna aperture 102, which is represented by n samples. Different values of p represent different configurations. Where $p=p_{max}$, the digital component is the identity transform. Where $p<p_{max}$ the digital transform effectively maps the digital signal streams to focal surface 414 so that p data streams are mapped onto p beams with wider beamwidths as shown with reference to FIG. 6. Wider beamwidths, in turn, are attained via excitation of only part of the continuous or quasi-continuous aperture of first antenna aperture 102.

Thus, transmitter system 300 can achieve a multiplexing gain of p where p can take on any value between 1 and $p_{max}$ corresponding to different configurations. The number of spatial beams used for communication is equal to p. While the highest capacity is achieved for $p_{max}$, lower values of p are advantageous in applications involving mobile links in which the transmitter and/or the receiver are moving due to the beam agility capability. For $p<p_{max}$, by appropriately reconfiguring the digital transform $U_e$ or $U_eU_{red}$, the p data streams can be encoded into p beams with wider beamswidths, which still cover the entire aperture of the receiver array. The use of wider beamwidths relaxes the channel estimation requirements in transmitter system 300.

Figure 12:
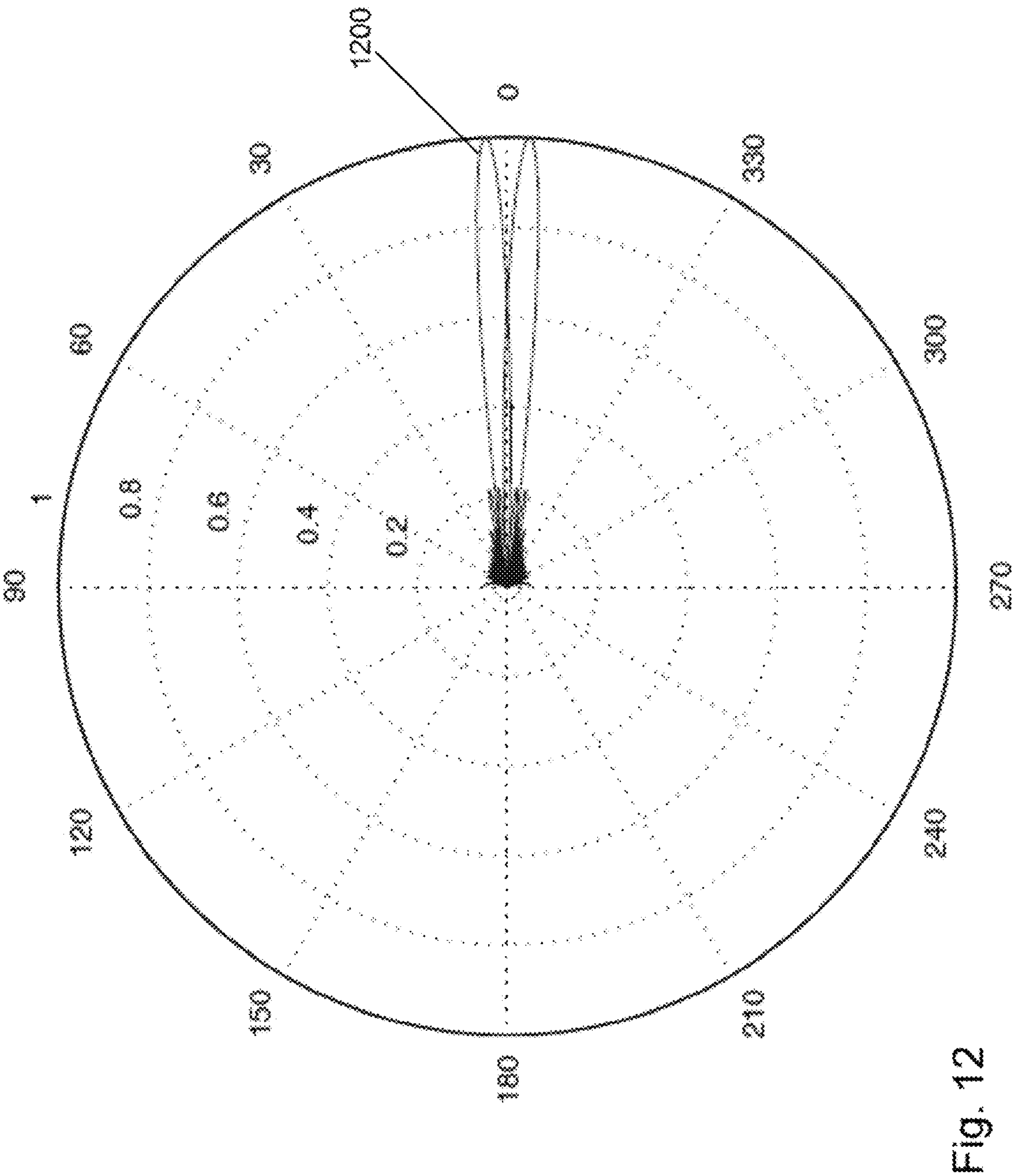
FIG. 12 depicts a second beampattern generated using the transmitter system and intercepted by a receive antenna of the communication system of FIG. 1 in accordance with a second illustrative embodiment.
Figure 13:
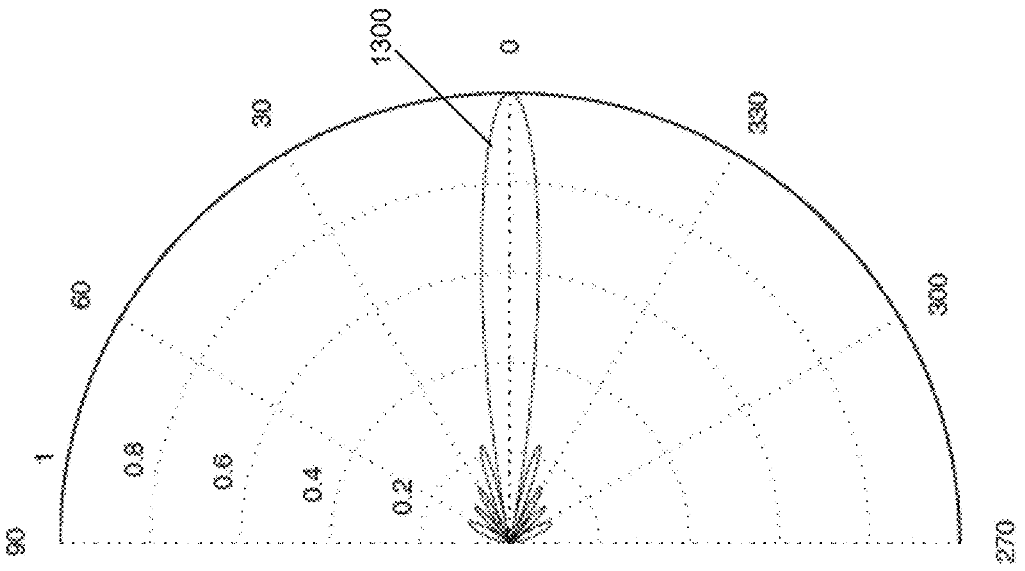
FIG. 13 depicts a third beampattern generated using the transmitter system and intercepted by a receive antenna of the communication system of FIG. 1 in accordance with a third illustrative embodiment.

For example with reference to FIG. 2*a*, n=40 and $p_{max}=4$. With reference to FIG. 2*b*, beampattern 202 is generated for $p=p_{max}=4$, resulting in four narrow beams that couple with the receiver aperture. With reference to FIG. 12, a beampattern 1200 is generated for p=2, resulting in two wider beams that couple with the receiver aperture for simultaneously transmitting two independent data streams, but with a beamwidth approximately twice the beamwidth shown in FIG. 2*b*. As a result, the two beams still cover the entire receiver aperture. With reference to FIG. 13, a beampattern 1300 is generated for p=1, resulting in one wide beam that couples with the receiver aperture for transmitting only one independent data stream, but with a beamwidth approximately four time the beamwidth shown in FIG. 2*b*. For $p<p_{max}$ wider beamwidths are achieved via reconfigured versions of the digital transform $U_e$ or $U_eU_{red}$ that correspond to illuminating a smaller fraction of first antenna aperture 102. This, in turn, requires excitation of a few more than $p_{max}$ feed elements on focal surface 414, thereby slightly increasing the A/D complexity of transmitter system 300.

Figure 14:
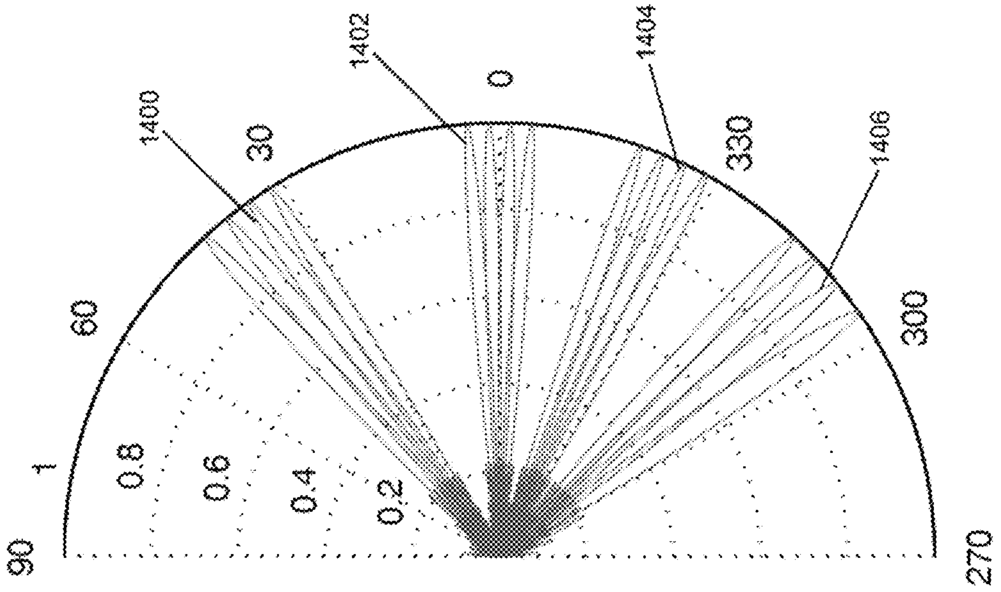
FIG. 14 depicts a fourth beampattern generated using the transmitter system and intercepted by a plurality of receive antennas in accordance with a fourth illustrative embodiment.

With reference to FIG. 14, a point-to-multipoint capability of transmitter system 300 is shown in accordance with an illustrative embodiment. Transmitter system 300 simultaneously transmits to K=4 spatially distributed receivers in a network setting. In the illustration, n=40 and $p_{max}$=4 for each individual link 1400, 1402, 1404, 1406. Thus, $p_{max}$=4 data streams are simultaneously transmitted to each receiver, via the corresponding beams, resulting in a total of $p_{max}K=16$ streams/beams.

Given 1D LoS links in which the transmitter and receiver have antennas of different sizes, $A_T$ and $A_R$, respectively. Let $n_t$ and $r_r$ denote the corresponding number of analog modes associated with the apertures. The maximum number of digital modes, $p_{max}$, supported by the LoS link is then given by $p_{max} \approx A_T A_R/(R\lambda_c)$. The details described with reference to transmitter system 300 are applicable, using $n=n_t$ at the transmitter and $n=n_r$ at the receiver.

Transmitter system 300 can also be used in a multipath propagation environment. An important difference in multipath channels is that the number of digital modes $p_{max}$ is larger and depends on the angular spreads subtended by the multipath propagation environment at the transmitter and the receiver. For simplicity, suppose that the propagation paths connecting the transmitter and receiver exhibit physical angles within the following (symmetric) ranges:

$$\theta hd\ t \in [-\phi_{t,max}, \phi_{t,max}], \phi_r \in [-\phi_{r,max}, \phi_{r,max}]$$

where $\phi_t$ and $\phi_r$ denote the physical angles associated with propagations paths at the transmitter and receiver, respectively, and $\phi_{t,max}$ and $\phi_{r,max}$ denote the angular spread of the propagation environment as seen by the transmitter and receiver, respectively. In this case, as in the LoS case, $p_{max}$ depends on the number of orthogonal spatial beams/modes on the transmitter and receiver side that lie within the angular spread of the scattering environments. To calculate $p_{max}$, first calculate the (normalized) angular spreads according to equation (4) for critical $d=\lambda_c/2$ spacing:

$$\theta_{t,max}=0.5 \sin \phi_{t,max}, \phi_{r,max}=0.5 \sin \phi_{r,max}$$

The spatial resolutions (measure of the beamwidths) at the transmitter and the receiver are given by $$\Delta\theta_{o,t} = \frac{1}{n_t}, \Delta\theta_{o,r} = \frac{1}{n_r}$$

Then, analogous to the derivation of (14), the number of orthogonal beams at the transmitter and the receiver that couple with the multipath propagation environment are given by $$p_{max,t} = \frac{2\theta_{max,t}}{\Delta\theta_{o,t}} = \sin\phi_{t,max} n_t \approx \frac{2A_T \sin\phi_{t,max}}{\lambda_c}$$

$$p_{max,r} = \frac{2\theta_{max,r}}{\Delta\theta_{o,r}} = \sin\phi_{r,max} n_r \approx \frac{2A_R \sin\phi_{r,max}}{\lambda_c}$$

and the maximum number of digital modes supported by the multipath link is given by the minimum of the two $p_{max}$–min $(p_{max,t}, p_{max,r})$.

The receiver system includes second antenna aperture 104, the plurality of feed elements 301, and signal processor 302. Specifically, in terms of the system equation (1), the n-dimensional received signal r, representing the signal on second antenna aperture 104, is mapped to an n-dimensional signal, $r_a$, on focal surface 414 via $$r_a = U_a^H r \tag{27}$$

where the n×n matrix/transform $U_a^H$ represents the mapping from second antenna aperture 104 to the feeds the plurality of feed elements 301 mounted on focal surface 414. As in the case of transmitter system 300, on the order of $p_{max}$ elements of $r_a$ (feeds on the focal surface), out of the maximum possible n, carry most of the significant received signal energy. A/D conversion at the receiver (including down conversion from passband to baseband) applies to the active elements of $r_a$. Thus, the complexity of the A/D interface at the receiver system has a complexity on the order of $p_{max}$. The resulting vector of digital symbols, derived from $r_a$ via A/D conversion, can be processed using any of a variety of algorithms known in the art (e.g., maximum likelihood detection, MMSE (minimum mean-squared-error) detection, MMSE with decision feedback) to form an estimate of the transmitted vector of digital symbol $x_e$.

Any of a variety of space-time coding techniques may also be used at the transmitter in which digital information symbols are encoded into a sequence/block of coded vector symbols, $\{x_e(i)\}$, where i denotes the time index. The receiver architecture is modified accordingly, as known in the art. In this case, the corresponding sequence/block of received (coded) digital symbol vectors, derived from $r_a$, is processed to extract the encoded digital information symbols.

Given a LoS link in which both the transmit and the receive antennas consist of square apertures of dimension A×A $m^2$ and are separated by a distance of R meters, the maximum number of analog and digital modes is simply the square of the linear counterparts:

$$n_{2d} = n^2, n \approx 2A/\lambda_c$$

$$p_{max,2d} = p_{max}^2, p_{max} \approx \frac{A^2}{R\lambda_c}.$$

The resulting system is characterized by the $n_{2d} \times n_{2d}$ matrix $H_{2d}$ that is related to the 1D channel matrix H in equation (12) via $$H_{2d} = H \otimes H$$

where ⊗ denotes the kronecker product. The eigenvalue decomposition of the transmit covariance matrix is similarly related to its 1D counterpart in equation (15).

$$\Sigma_{T,2D} = H_{2d}^H H_{2d} = V_{2d} \Lambda_{2d} V_{2d}^H$$

$$V_{2d} = V \otimes V, \Lambda_{2d} = \Lambda \otimes \Lambda$$

The channel power is also the square of the 1D channel power: $\sigma_{c,2d}^2 = n_{2d}^2 = n^4 = \sigma_c^4$.

Let $x_e(i)=[x_{e,1}(i), x_{e,2}(i), \ldots, x_{e,p}(i)]^T$ denote the p-dimensional vector input digital symbols at time index i. The p input digital data streams correspond to the different components of $x_e(i)$. The digital symbols may be from any discrete complex constellation Q of size |Q|. For example, |Q|=4 for 4-QAM. Each vector symbol contains p $\log_2|Q|$ bits of information, $\log_2|Q|$ bits per component.

The digital transform $U_e$ is a n×p matrix that operates on the (column) vector $x_e(i)$ for each i; that is, $x_a(i)=U_e x_e(i)$, i=1,2, . . . where $x_a(i)=[x_{a,1}(i), x_{a,2}(i), \ldots, x_{a,n}(i)]^T$ is the n-dimensional vector of (digitally processed) digital symbols at the output of $U_e$ at time index i. As noted earlier, for each i, only a small subset of output symbols in $x_a(i)$, on the order of $p_{max}$, is non-zero. Let this subset be denoted by 0. The D/A conversion and upconversion to passband occurs on this subset of symbols. The analog signal for a given component of $x_a(i)$ in 0 can be represented as $$x_{a,l}(t) = \sum_i x_{a,l} g(t - iT_s),\ l \in O$$

where $x_{a,l}(t)$ denotes the analog signal, at the output of the D/A, associated with the l-th output data stream in the set 0, g(t) denotes the analog pulse waveform associated with each digital symbol, and $T_s$ denotes the symbol duration.

The analog signal for each active digital stream $x_{a,l}(t)$ is up-converted onto the carrier $$x_{a,l}(t) \rightarrow x_{a,l}^c(t)\cos(2\pi f_c t) - x_{a,l}^s(t)\sin(2\pi f_c t), l \in 0$$

where $x_{a,l}^c(t)$ and $x_{a,l}^s(t)$ denote the in-phase and quadrature-phase components of $x_{a,l}(t)$. The upconverted analog signals corresponding to the active components in 0 are then fed to corresponding feeds on focal surface 414.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A transmitter comprising:

a signal processor configured to simultaneously receive a plurality of digital data streams and to transform the received plurality of digital data streams into a plurality of analog signals, wherein the number of the plurality of digital data streams is selected for transmission to a single receive antenna based on a determined characteristic of a communication environment and a dimension of an aperture;

a plurality of feed elements configured to receive the plurality of analog signals, and in response, to radiate a plurality of radio waves toward the aperture; and the aperture configured to receive the radiated plurality of radio waves, and in response, to radiate a second plurality of radio waves toward the single receive antenna.

2. The transmitter of claim 1, wherein the aperture is further configured to spatially phase shift the received plurality of radio waves to form the second plurality of radio waves radiated toward the single receive antenna.

3. The transmitter of claim 1, wherein the aperture comprises a lens.

4. The transmitter of claim 3, wherein the lens comprises a discrete lens array.

5. The transmitter of claim 4, wherein the discrete lens array is comprised of miniaturized element frequency selective surfaces.

6. The transmitter of claim 5, wherein the miniaturized element frequency selective surfaces form sub-wavelength phase shifters.

7. The transmitter of claim 3, wherein the plurality of feed elements are mounted on a focal surface of the lens.

8. The transmitter of claim 1 wherein the signal processor is further configured to simultaneously receive a second plurality of digital data streams and to transform the received second plurality of digital data streams into a second plurality of analog signals, wherein the number of the second plurality of digital data streams is selected for transmission to a second receive antenna based on a determined transmission environment to the second receive antenna;

the plurality of feed elements is further configured to receive the second plurality of analog signals, and in response, to radiate a third plurality of radio waves toward the aperture; and the aperture is further configured to receive the radiated third plurality of radio waves, and in response, to radiate a fourth plurality of radio waves toward the second receive antenna, wherein the fourth plurality of radio waves are radiated simultaneously with the second plurality of radio waves.

9. The transmitter of claim 1, wherein the determined characteristic of the communication environment includes a signal-to-noise ratio.

10. The transmitter of claim 1, wherein the number of the plurality of digital data streams is selected from the set comprising 1, 2, . . . , $p_{max}$, wherein $p_{max}$ is approximately $A_R A_T/(R\lambda_c)$, where $A_R$ is a length of a receive aperture of the single receive antenna, $A_T$ is a length of the aperture, R is a distance between the aperture and the receive aperture, and $\lambda_c = c/f_c$, where c is the speed of light and $f_c$ is a carrier frequency of the transmitted plurality of analog symbols.

11. The transmitter of claim 10, wherein a feed number represents the number of the plurality of feed elements selected to receive the plurality of analog signals, wherein the feed number is greater than the selected number of the plurality of digital data streams if the selected number of the plurality of digital data streams is less than $p_{max}$.

12. The transmitter of claim 11, wherein the feed number is equal to the selected number of the plurality of digital data streams if the selected number of the plurality of digital data streams is equal to $p_{max}$.

13. The transmitter of claim 11, wherein each feed element of the plurality of feed elements selected to receive the plurality of analog signals receives a single digital data stream of the plurality of digital data streams if the selected number of the plurality of digital data streams is equal to $p_{max}$.

14. The transmitter of claim 11, wherein each feed element of the plurality of feed elements selected to receive the plurality of analog signals receives multiple data streams of the plurality of digital data streams if the selected number of the plurality of digital data streams is less than $p_{max}$.

15. The transmitter of claim 1, wherein the number of the plurality of digital data streams is selected from the set comprising 1, 2, . . . , $p_{max}$, wherein $p_{max}=\min(p_{max,t}, p_{max,r})$, where $$p_{max,t} = \frac{2A_T \sin\phi_{t,max}}{\lambda_c},\quad p_{max,r} = \frac{2A_R \sin\phi_{r,max}}{\lambda_c},$$

$A_R$ is a length of a receive aperture of the single receive antenna, $A_T$ is a length of the aperture, $\phi_{t,max}$ is a first angular spread of a propagation environment as seen by the aperture, $\phi_{r,max}$ is a second angular spread of the propagation environment as seen by the receive aperture, and $\lambda_c=c/f_c$, where c is the speed of light and $f_c$ is a carrier frequency of the transmitted plurality of analog symbols.

16. The transmitter of claim 1, wherein the signal processor is configured to transform the plurality of digital data streams into the plurality of analog signals using a transform that includes a discrete Fourier transform mapping the plurality of digital data streams into a reduced aperture if the selected number of the plurality of digital data streams is less than $p_{max}$.

17. The transmitter of claim 16, wherein the signal processor is further configured to transform the plurality of digital data streams into the plurality of analog signals using a transform that includes an oversampled inverse discrete Fourier transform if the selected number of the plurality of digital data streams is less than $p_{max}$.

18. The transmitter of claim 1, wherein the plurality of digital data streams are transformed into the plurality of analog signals using a transform that includes $U_e$ where $$U_e(l, m) = \frac{1}{n_a\sqrt{n_{os}}} f_{n_a}\left(\frac{1}{n_a}\left(\frac{l}{n_{os}} - m\right)\right),$$

where $f_n(\cdot)$ is defined as $$\frac{\sin(\pi n(\cdot))}{\sin(\pi(\cdot))},$$

l is a first index to a feed element of the plurality of feed elements, m is a second index to a data stream of the plurality of digital data streams, $n_{os}=p_{max}/p$, where $p_{max}$ is approximately $A_R A_T/R\lambda_c$), where $A_R$ is a length of a receive aperture of the single receive antenna, $A_T$ is a length of the aperture, R is a distance between the aperture and the receive aperture, and $\lambda_c=c/f_c$, where c is the speed of light and $f_c$ is a carrier frequency of the plurality of analog signals, p is the number of the plurality of digital data streams, $n_a=n/n_{os}$ where n is approximately $2A_T/\lambda_c$.

19. The transmitter of claim 18, wherein the plurality of digital data streams are transformed into the plurality of analog signals using a transform that includes $U_{red}$ where $U_{red}$ is a pxp dimensional matrix of eigenvectors of a pxp transmit covariance matrix of a reduced-dimensional nxp channel matrix.

20. The transmitter of claim 1, wherein the aperture is a reflective surface.

* * * * *

UNITED STATES PATENT AND TRADEMARK OFFICE

CERTIFICATE OF CORRECTION

PATENT NO. : 8,811,511 B2
APPLICATION NO. : 12/891887
DATED : August 19, 2014
INVENTOR(S) : Akbar M. Sayeed et al.

It is certified that error appears in the above-identified patent and that said Letters Patent is hereby corrected as shown below:

IN THE SPECIFICATION

Col. 4, Line 41

Delete "$\{x_2(i)\}$" and replace with --$\{x_e(i)\}$--

Col. 4, Line 42

Delete "$x_e(I)$" and replace with --$x_e(i)$--

Col. 7, Line 56

Delete "periodic in B" and replace with --periodic in $\theta$--

Col. 9, Line 50 (equation 15)

Delete "$\Sigma_T = H^H H = V^{\Lambda} V^H$" and replace with --$\Sigma_T = H^H H = V \Lambda V^H$--

Col. 9, Line 55

Delete "$C_N(0, V\Lambda^{\Lambda} V^H)$" and replace with --$C_N(0, V \Lambda V^H)$--

Col. 10, Line 10 (equation 17)

Delete "$n_a(p) = n/n_{os} = n_p/p_{max}$" and replace with --$n_a(p) = n/n_{os} = np/p_{max}$--

Col. 14, Line 3

Delete "$\Sigma_{tx,red}$ =HredHHred" and replace with --$\Sigma_{tx,red} = H_{red}^H H_{red}$--

Signed and Sealed this
Twenty-fourth Day of March, 2015

Michelle K. Lee

Michelle K. Lee
*Director of the United States Patent and Trademark Office*

IN THE SPECIFICATION

Col. 14, Line 7 (equation 25)

Delete "$\Sigma_{tx,red} = U_{red} {}^{\Lambda}{}_{red} U_{red}{}^{H}$" and replace with --$\Sigma_{tx,red} = U_{red} \Lambda_{red} U_{red}^{H}$ --

Col. 15, Line 26

Delete "θ*hd t*" and replace with --$\phi_t$--

Col. 15, Line 37

Delete "$\phi_{r,max} = 0.5 \sin \phi_{r,max}$" and replace with --$\theta_{r,max} = 0.5 \sin \phi_{r,max}$--

Col. 15, Lines 59-60

Delete "$p_{max} - \min (p_{max,t}, p_{max,r})$" and replace with --$p_{max} = \min (p_{max,t}, p_{max,r})$--

IN THE CLAIMS

Col. 19, Line 5 (claim 15)

Delete " $p_{max,t} = \frac{2A_T \sin \emptyset_{t,max}}{\lambda_c}, p_{max,r} = \frac{2A_R \sin \emptyset_{r,max}}{\lambda_c}$ " and replace with -- $p_{max,t} = \frac{2A_T \sin \phi_{t,max}}{\lambda_c}, p_{max,r} = \frac{2A_R \sin \phi_{r,max}}{\lambda_c}$ --